(12) United States Patent
Gaeta et al.

(10) Patent No.: US 7,607,819 B2
(45) Date of Patent: Oct. 27, 2009

(54) DISPOSABLE COUPLING AND LINER FOR CONTAINERS

(76) Inventors: Mark Gaeta, 6 Susan Dr., Fort Salongs, NY (US) 11768; Clifford Broderick, 109 Barnes Rd., Washingtonville, NY (US) 10992

( * ) Notice: Subject to any disclaimer, the term of this patent is extended or adjusted under 35 U.S.C. 154(b) by 797 days.

(21) Appl. No.: 11/027,776

(22) Filed: Dec. 31, 2004

(65) Prior Publication Data

US 2005/0242115 A1 Nov. 3, 2005

Related U.S. Application Data

(60) Provisional application No. 60/533,772, filed on Dec. 31, 2003.

(51) Int. Cl.
*B01F 13/06* (2006.01)
*B01F 9/00* (2006.01)
(52) U.S. Cl. .................... 366/182.4; 366/192; 366/228; 383/3
(58) Field of Classification Search .............. 366/182.4, 366/192, 349, 220, 228; 383/3, 42, 100
See application file for complete search history.

(56) References Cited

U.S. PATENT DOCUMENTS

| | | | | | |
|---|---|---|---|---|---|
| 2,499,421 | A | * | 3/1950 | Samler | 264/178 R |
| 2,511,481 | A | * | 6/1950 | Schneider | 229/117.35 |
| 2,564,656 | A | * | 8/1951 | Chedister | 156/145 |
| 2,566,838 | A | * | 9/1951 | Hurt | 383/42 |
| 2,604,297 | A | * | 7/1952 | Winstead | 137/223 |
| 2,745,754 | A | * | 5/1956 | Steinbock | 426/112 |
| 2,755,971 | A | * | 7/1956 | Lisciani | 222/189.01 |
| 3,147,041 | A | * | 9/1964 | Howcroft | 406/109 |
| 3,819,107 | A | * | 6/1974 | Ryder | 206/219 |
| 3,889,743 | A | * | 6/1975 | Presnick | 165/46 |
| 4,934,654 | A | * | 6/1990 | Linnemann | 251/144 |

* cited by examiner

*Primary Examiner*—David L Sorkin
(74) *Attorney, Agent, or Firm*—Thomas A. O'Rourke; Bodner & O'Rourke, LLP

(57) ABSTRACT

A disposable liner for use in a vessel used for blending chemicals is described. The liner has a body with an inside and an outside surface and at least one orifice for receiving and discharging a product contained in the body. The body has at least one layer of a flexible thermoplastic material that can be incinerated to dispose of liner. The liner is adapted to conform generally to at least a portion of the inner surface of the vessel when chemicals are present in the liner. The liner is insertable into the vessel and removable therefrom to dispose of the liner.

27 Claims, 53 Drawing Sheets

B-B

D-D

E-E

F-F

G-G

H-H

I-I

J-J

K-K

L-L

M-M

N-N

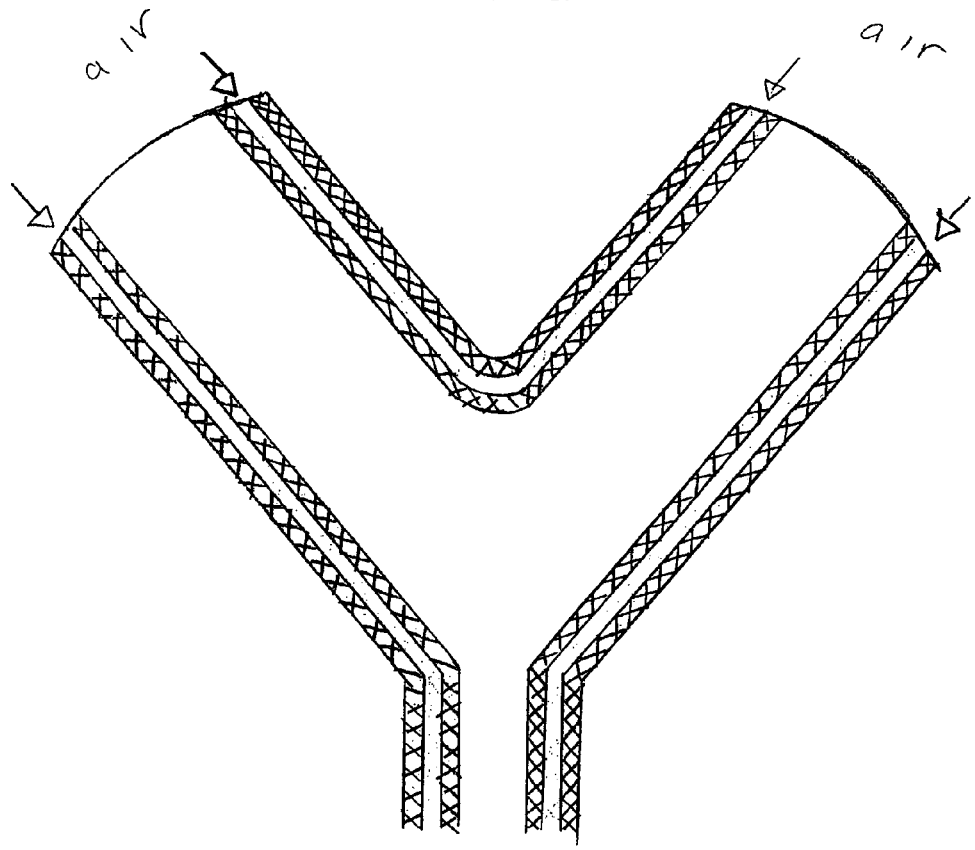
FIG. 32
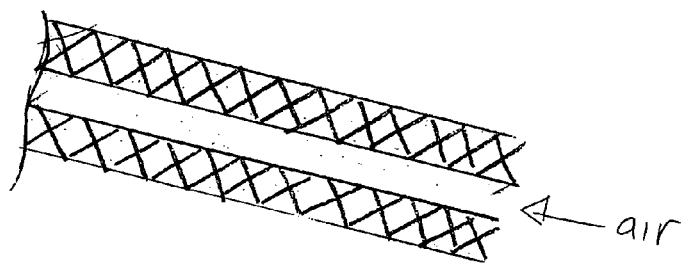

DISPOSABLE COUPLING AND LINER FOR CONTAINERS

This is a conversion of U.S. Provisional Patent Application Ser. No. 60/533,772 filed Dec. 31, 2003, the disclosures of which are incorporated herein by reference.

BACKGROUND OF THE INVENTION

Worker safety is a critical consideration for owners of industrial plants. Along with complying with federally mandated standards, industrial plant owners regulate themselves in areas such as cleanliness, safety, emissions and hazard substance and material handling. Particularly, plants that use heavy machinery and/or large or small batches of chemicals can be very dangerous to, or have exposure issues with workers.

One industry, in particular, that is regulated because of its product and the working conditions associated with its manufacture is the chemical industry. Chemical plants including but not limited plants preparing pharmaceutical, neutraceuticals, and/or cosmetic products typically use large batches of many different chemicals for mass production of medicines, pharmaceuticals, neutraceuticals, cosmetics, and other products. Many times the chemicals used are highly toxic, with very low exposure limit levels, or are used in such amounts that they are highly potent. Some chemicals may be carcinogenic. While mass production eliminates the costs of small-scale production, new dangers are present due to the amount or quality of chemicals used. Dangers associated with large scale use of chemicals usually include operation and handling of the chemicals. Also, hazards are apparent concerning use and cleaning of the manufacturing machinery.

In addition, during development of many of these chemicals in the pilot scale batch, and in early processing steps workers typically work with very concentrated forms of these highly toxic substances. It has become standard practice to handle these processing steps in "glove boxes" or containment/isolation booths to provide isolation of the chemicals from the operator and other personnel. This is a common practice during the development and dispensing of certain chemicals as a precaution to protect workers. Typically, sealed containers of these chemicals are placed into a clean containment "glove box" or containment booth where the chemicals are weighed or processed in a closed environment which protects the worker from exposure. Hence, there is a need for a process and apparatus which offers significant protection from residual chemicals once the dispensing or processing takes place even though the containers are sealed.

There can be residual toxic chemicals inside the containment "glove box" or containment/isolation booth, which must be manually cleaned after each use with the potential of worker exposure to these chemicals requiring additional precautions such as various protective devices which workers must wear. These devices can be full "space suit" type supplied air suits to disposable non-permeable gowns with hoods and disposable respirators. All of these practices pose risk for worker exposure to highly toxic substances. The present invention teaches an apparatus which facilitates the disposal of the "containment zone" upon completion of this step of the process.

Many chemical plants have instituted emergency protocols for leaks, spillages, explosions or other product migrations, such as dust or vapor. However, smaller problems, such as normal expulsion of fumes, dust particles or slight chemical contact, may go relatively unnoticed, which can represent significant risk. Another cause of worker health concern is the generation of airborne vapors and particulates. These lesser problems may be happening on a smaller scale, but may happen with increased frequency, thus posing a significant health risk to workers.

In the pharmaceutical, neutraceutical and cosmetic industries, large batches of chemicals are typically dispensed into containers for mixing, heating or other processing. These containers typically will have to be coupled to a receiving container as the product receives, for example, future processing or for transportation. More frequently, this coupling is a connection between two plates, that when joined act as a split valve. When the split valve is opened, the chemical is released into the receiving container. Then, the split valve can be shut and the two plates disconnected. This maintains a clean surface, which the worker may come into contact with. However, at some point, the delivering container may need to hold a different chemical. Therein presents a problem, because a mixture of the first chemical and the subsequent chemical may be highly volatile or have contamination issues for the next product, such as the case with pharmaceuticals. Hence, a worker may still have to clean the containers, and thus, be exposed to the chemical. Additionally, the more time spent cleaning the containers decreases the production rate of the pharmaceuticals or other products resulting in lost profits.

In overcoming this problem of worker exposure to chemicals, the present invention is directed to a disposable coupling and liner for use with containers, vessels or glove boxes. The present invention incorporates an easily and inexpensively manufactured device, which can be replaced, instead of cleaned. Disposal may be by incineration, which will cost significantly less than cleaning when labor costs are factored in.

OBJECTS OF THE INVENTION

It is an object of the present invention to provide a disposable coupling and/or liner for use with containers in the chemical industries, particularly for pharmaceutical, neutraceutical and cosmetic manufacture.

It is also an object of the present invention to provide a disposable coupling and/or liner for use with containers in glove boxes.

It is an other object of the present invention to provide a disposable coupling and/or liner for use with containers which do not have to be cleaned.

It is a future object of the present invention to provide a disposable coupling and/or liner for use with containers and processing equipment which will prevent worker-exposure to the chemicals.

It is still another object of the present invention to provide a disposable coupling and/or liner for use with containers which will provide a sanitary and safe working condition for personnel in the chemical industry.

SUMMARY OF THE INVENTION

The present invention is directed to a plastic disposable container useful in mixing, treating, transporting etc. chemicals and other products useful in the manufacturing of, for example, pharmaceuticals, neutraceuticals, and/or cosmetic and alike. This container may be any shape and will typically have an inlet port for receiving product and an outlet port for product to be evacuated. In some embodiments, the inlet port and outlet port may be the same. The container be made from a thermoplastic material and is disposable preferably through incineration. At least one exit port, there is preferably a coupling for connecting the container to a second container or another receptacle. The coupling is preferably made from plastic material which capable of being incinerated. The coupling may be integrated with the container or it may be separate. The coupling can be in the form of any one of the numerous conventional coupling that are presently available. In a preferred embodiment, the disposable coupling and liner of the present invention are both manufactured from a thermoplastic material, Tyvek® and/or films, or sheets, or a combination of these materials. Preferably the coupling will be a rigid plastic while the liner may be a thin, sheet-like plastic, a laminate of composites or related compositions.

In one embodiment, the disposable coupling may connect a first container to a second container. Typically, the first container may be a funnel or other shaped vessel, with the outlet positioned over the inlet of the second container or apparatus, which is typically a storage or mixing container. The funnel or other shaped container may be useful for depositing a certain amount of a chemical into a storage container, manufacturing equipment or into a mixing container.

Attaching to the outlet portion of the first container may be, for example, the body of the container or a connecting sleeve. The connecting sleeve may be defined by a flange adapted to removably attach the connecting sleeve to the funnel portion of the container. Also, the connecting sleeve may be generally circular, taking the form of a cylinder. At an end of the connecting sleeve opposite the flange may be an upper valve member. The upper valve member and flange may provide an airtight seal when the connecting sleeve is attached to the first container. The connecting sleeve can be fixed to the funnel portion by any suitable method, such as heat-sealing, in that each element is made of plastic, a locking collar or a tie fastener. The locking collar and tie fastener can fit around the outer portion of the connecting sleeve, that which is exposed to the atmosphere, and provide an airtight fit seal between the connecting sleeve and funnel portion.

The upper valve member may have a generally flat lower surface and a generally flat upper surface. The lower surface of the upper valve member may be adapted to never contact the chemical within the flat container. The upper surface may retain the chemical within the first container.

Attached to an opening of the second container may be the body of the second container or a receiving sleeve. The receiving sleeve may be generally defined having a circular cross-section, taking the form of a cylinder. Preferably, the receiving sleeve will have the same radius as the connecting sleeve. A flange may attach the receiving sleeve to the opening on the second container. At an end of the receiving sleeve opposite the flange may be a lower valve member. The lower valve member and flange may provide an airtight seal when the receiving sleeve is attached to the second container.

The lower valve member may have a generally flat upper surface and a generally flat lower surface. The upper surface of the lower valve member may be adapted to never contact the chemical within the second container. The lower surface may retain the chemical within the second container, acting as a lid.

In operation, the receiving sleeve may be attached to an extendable tube which also attaches to the opening of the second container. If the receiving sleeve is not attached to an extendable tube, it is contemplated that the liner may attach directly to the valve, or that they may be a continuous formation. The first container may be positioned over the second container with each container's opening aligning on a generally vertical axis. As the extendable tube is raised up toward the first container, the receiving sleeve will contact the connecting sleeve. Alignment of the sleeves may be accomplished by a guide rod attached to the receiving sleeve and a positioning loop attached to the connecting sleeve. When in close proximity, the guide rod may fit through the positioning loop to ensure alignment along the same axis. Additionally, alignment will help create the necessary seal for chemical transfer.

When the lower surface of the upper valve member of the connecting sleeve meets the upper surface of the lower valve member of the receiving sleeve, they can mate to form a solitary valve member. Preferably, the valve member takes the form of a split valve or, alternatively a butterfly valve. In this manner, the valve member, once formed and locked into place becomes ratable along a central axis. Thus, as the valve member rotates, chemicals from the first container pass through the connecting sleeve into the receiving sleeve and into the second container. The split valve itself is preferably manufactured out of plastic. However, it is contemplated that a portion of the split valve may be manufactured out of stainless steel or a similar material.

The seal created by the connection of the connecting sleeve to the receiving sleeve can be further enhanced by a locking mechanism. Clamps may lock the sleeves together, or any other suitable locking means that can provide an airtight seal. An airtight seal may prevent chemical exposure to the workers in the form of leaks during transfer.

In the prior art, when the first container was empty or the operator closed the split valve, the container, connecting sleeve and receiving had to be cleaned. Hence, the workers may be further exposed to the chemicals. However, the present invention overcomes this exposure problem in two ways. First, both the connecting sleeve and the receiving sleeve may be manufactured from plastic. In a relatively simple design which comprises a cylindrical housing, a flange, an upper or lower valve member, and potentially an aligning mechanism, the sleeves may be disposed of after a single use. Disposal of plastic may be by incineration. Preferably, the plastic may be polypropylene, polyethylene, etc. However, the plastic may be rigid enough to provide a hard seal when the sleeves are connected. There may also be gasketting material manufactured of neoprene, latex or other flexible materials. Also, the sleeves may be used multiple times if the same chemical is passing through. However, plastic manufacture, by preferably injection molding, will keep costs low enough to dispose of the sleeves after a single use. Use of plastic can eliminate the need for cleaning and limit the amount of worker exposure to the chemicals. The plastic used may be PVC, polyethylene, propylene or other compound.

While the sleeves may be manufactured from plastic, which will eliminate the need to clean them, the first container must also be cleaned after use. The present invention includes a liner which can attach to the connecting sleeve. The liner may attach to the connecting sleeve in any suitable manner, such as adhesive, mechanical means, welding or RF heating. Alternatively, the container and the sleeve may be formed together such as by extrusion, the liner may include a plurality of ribs of baffles which can facilitate the blending of elements within the liner.

In operation, the liner can be positioned over an inner surface of the first container. In this position, the liner may be inflated, if needed. When the chemicals are deposited within the first container, the liner will prevent them from contacting the inner surface. When the chemicals are emptied from the first container, the liner may be extracted and disposed of in the same method as the sleeves.

Preferably, the liner is a soft plastic that is manufactured in a sheet-like form or a blown film. Alternatively, the liner may be a pouch which may fit into the first container. The liner may take a funnel-shape similar to that of the first container, or may be deformable to take the shape of any container. As a soft plastic, the liner may be extracted from the first container through its lower outlet portion or its upper inlet portion. In either instance, a disposable liner will virtually eliminate worker exposure to chemicals.

Additionally, in pouch form, the liner may be equipped with a venting means or filter. A venting means will allow air to enter into the pouch, which may force the chemicals through the connecting sleeve, or to inflate the liner prior to loading. Venting means should allow air in while retaining chemical particles and fumes, and can be designed for that purpose by having a mesh of, for example, 0.02 micron pores. The venting means can also be utilized to evacuate gas, or deflate the pouch or liner after the completion of the processing cycle to facilitate removal of the pouch or liner, as well as allowing the pouch or liner to be compacted for efficient disposal. A venting means in particularly important due to the high potency of pharmaceutical, neutraceutical and/or cosmetic compounds/mixtures that may be in the liner. An inflation port may also be present on the liner. The inflation port can allow gas to be pumped into the liner as a catalyst for mixing, or to force the contents of the liner out. Also, gas may be pumped through the inflation port to ensure the liner or pouch is tightly fitted to the interior surface of the vessel or container, or to add rigidity to the liner or pouch. The inflation port may have a check valve to regulate the flow of gas.

The liner may be manufactured from any suitable material, such as plastic or rubber. Plastic manufacture may be from polyethylene, such as high, medium, low, linear low, and very low density. Additionally, polyethylene such as Exact® by Exxon®, Dowlex® by Dow, Attain®, Tyvek® by DUPONT®, or other plastics manufactured by Union Carbide may be used. Polypropylenes may also be used. Use of plastic can allow the liners to be manufactured by blow film method.

The present invention contemplates use in the pharmaceutical, neutraceutical and cosmetic industries, as well as other trades in which mixing large portions of substances, or mixing toxic/noxious substances takes place. Additionally, the present invention may be used in glove boxes in chemical labs.

The present invention can be utilized to protect workers in the case of toxic products, or as a means to reduce cleaning and cleaning validation costs of non toxic products including, but not limited to food products, dietary supplements, neutraceuticals or over the counter drugs. In the pharmaceutical industry when one piece of processing equipment is utilized for more than one product, a "cleaning validation study" must be conducted. This process ensures that there is no residual product or traces of such product remaining in the vessel or on the piece of equipment. This study requires a detailed scientific protocol and analytical instrumentation (with many individual analyses) which can add to the overall costs of the products as well as creating additional downtime, both of which effect the overall efficiency of the operation and therefore negatively impacting profitability.

BRIEF DESCRIPTION OF THE DRAWINGS

FIG. 4a is a side view of an alternative embodiment of the liner.

FIG. 4b is a view of an alternative embodiment of the liner taken along the line A-A shown in FIG. 4a.

FIG. 4c is a prospective view of the alternative embodiment of the liner shown in FIG. 4a.

FIG. 5b is a view of an alternative embodiment of the liner taken along the line B-B shown in FIG. 5a.

FIG. 5c is a prospective view of the alternative embodiment of the liner shown in FIG. 5a.

FIG. 6b is a view of an alternative embodiment of the lining taken along the line C-C showed in FIG. 6a.

FIG. 6c is a prospective view of the alternative embodiment of the liner shown in FIG. 6a.

FIG. 7b is a view of an alternative embodiment of the liner taken along the line D-D shown in FIG. 7a.

FIG. 7c is a prospective view of the alternative embodiment of the liner shown in FIG. 7a.

FIG. 8a is a side view of an alternative embodiment of the liner.

FIG. 8b is a view of an alternative embodiment of the liner taken along the line E-E shown in FIG. 8a.

FIG. 8c is a prospective view of the alternative embodiment of the liner shown in FIG. 8a.

FIG. 9a is a side view of an alternative embodiment of the liner.

FIG. 9b is a view of an alternative embodiment of the liner taken along the line F-F shown in FIG. 9a.

FIG. 9c is a prospective view of the alternative embodiment of a liner shown in FIG. 9a.

FIG. 10b is a view of an alternative embodiment of the liner taken along the line G-G shown in FIG. 10a.

FIG. 10c is a prospective view of the alternative embodiment of the liner shown in FIG. 10a.

FIG. 11b is a view of an alternative embodiment of the liner taken along the line H-H shown in FIG. 11a.

FIG. 11c is a prospective view of the alternative embodiment of the liner shown in FIG. 11a.

FIG. 12b is a view of an alternative embodiment of the liner taken along the line I-I shown in FIG. 12a.

FIG. 12c is a prospective view of the alternative embodiment of the liner shown in FIG. 12a.

FIG. 13b is a view of an alternative embodiment of the liner taken along the line J-J shown in FIG. 13a.

FIG. 13c is a prospective view of the alternative embodiment of the liner shown in FIG. 13a.

FIG. 14b is a view of an alternative embodiment of the liner taken along the line K-K shown in FIG. 14a.

FIG. 14c is a prospective view of the alternative embodiment of the liner shown in FIG. 14a.

FIG. 15b is a view of an alternative embodiment of the liner taken along the line L-L shown in FIG. 15a.

FIG. 15c is a prospective view of the alternative embodiment of the liner shown in FIG. 15a.

FIG. 16b is a view of an alternative embodiment of the liner taken along the line M-M shown in FIG. 10a.

FIG. 16c is a prospective view of the alternative embodiment of the liner shown in FIG. 16a.

FIG. 17b is a view of an alternative embodiment of the liner taken along the line N-N shown in FIG. 17a.

FIG. 17c is a prospective view of the alternative embodiment of the liner shown in FIG. 17a.

FIG. 18b is a view of an alternative embodiment of a "glove box" of FIG. 18a.

FIG. 18c is a view of an alternative embodiment of a "glove box" of FIG. 18a.

FIG. 20b is a cut-away view of an alternative embodiment of a sleeve and a liner shown in FIG. 20a where the split valve is in a "closed" position.

FIG. 32 is a cut-away view of a double-sleeve portion of a disposable blender.

DETAILED DESCRIPTION OF THE INVENTION

The present invention is directed to a disposable coupling and/or liner for containers. The present invention is also directed to disposable blenders and glove boxes glove box liners. Typically, the coupling, liner and other features of the present invention may be used in industries that involve chemicals, such as pharmaceuticals, neutraceuticals and cosmetics, or where containment of such chemicals is necessary or desired.

Figure 1:
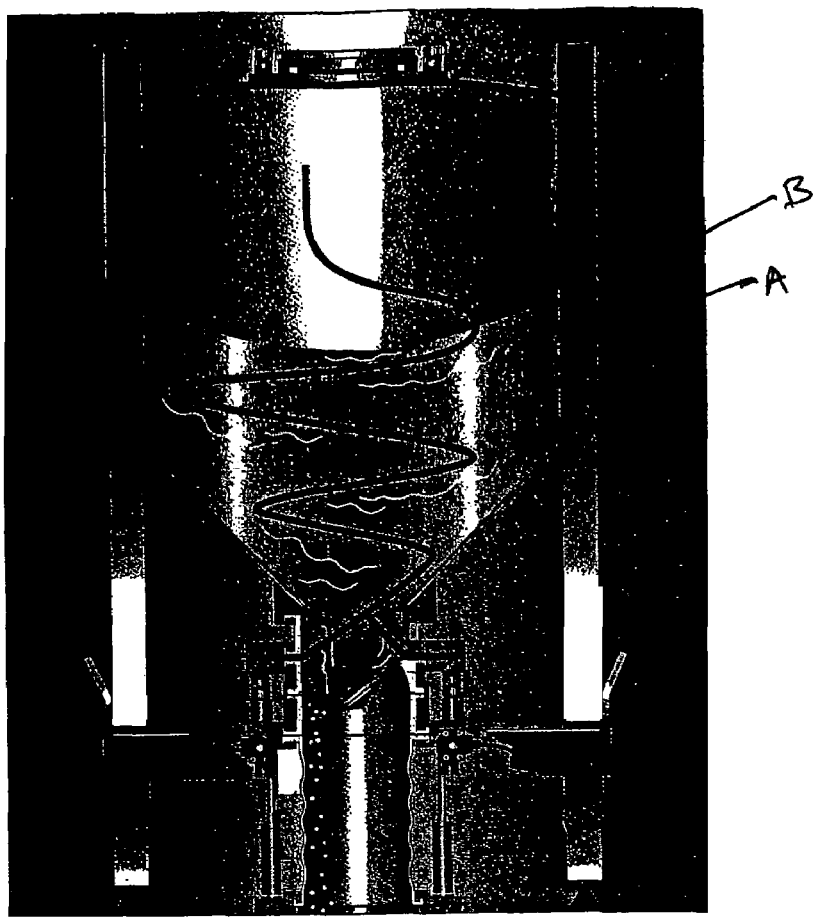
FIG. 1 is a cutaway view of a prior art split valve in use with a large container.
Figure 2:
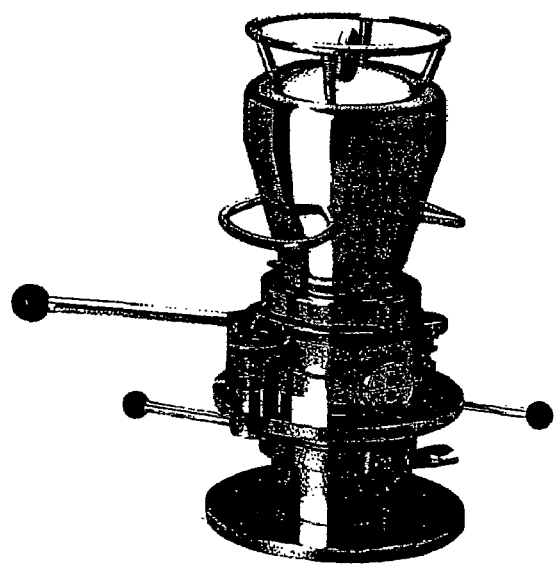
FIG. 2 is a perspective view of a prior art split valve in use with a small container.

As seen in FIG. 1 and FIG. 2, the prior art typically includes stainless steel containers and couplings, which are used to transfer chemicals. This method is undesirable, because stainless steel parts must be cleaned and/or sterilized before and after use to prevent exposure to workers. As seen in FIG. 1, the chemicals A contact the inner surface of the container B. The entire container typically must be cleaned after use, which can increase manufacturing and labor costs significantly. The present invention will significantly decrease maintenance costs and maintain a safer working environment.

Figures 4A, 4B:
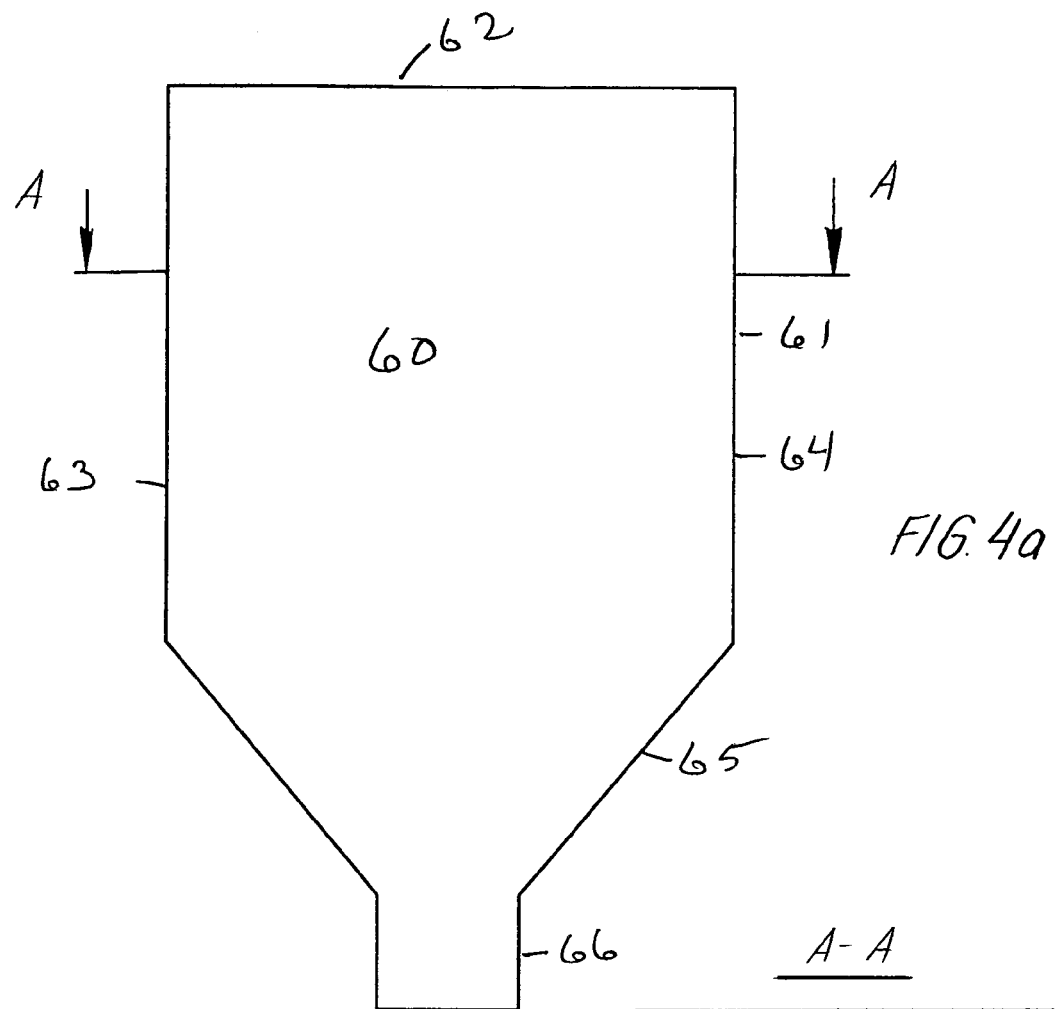
Figure 4C:
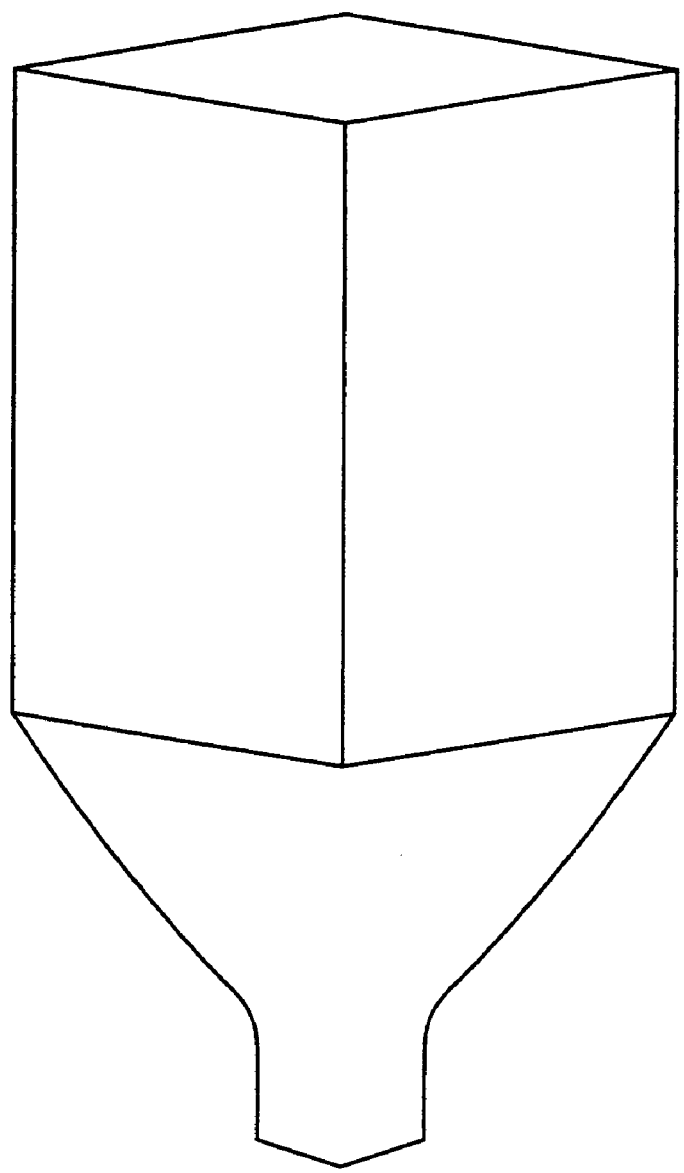
Figure 5A:
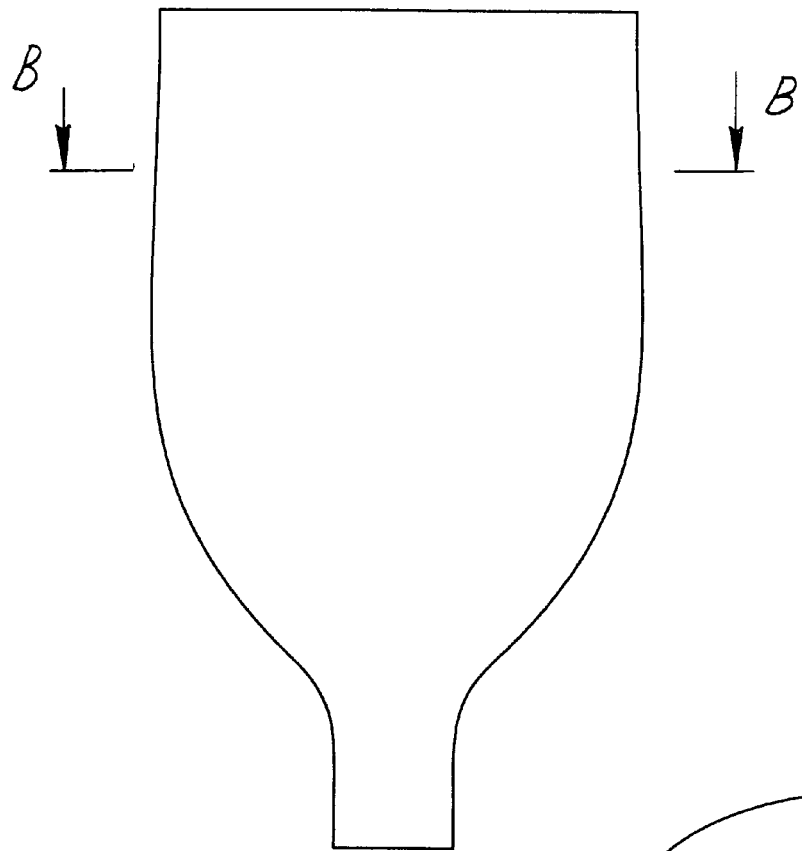
FIG. 5a is a side view of an alternative embodiment of the liner.
Figure 5B:
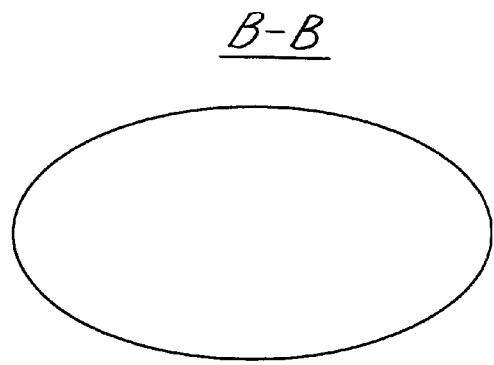
Figure 5C:
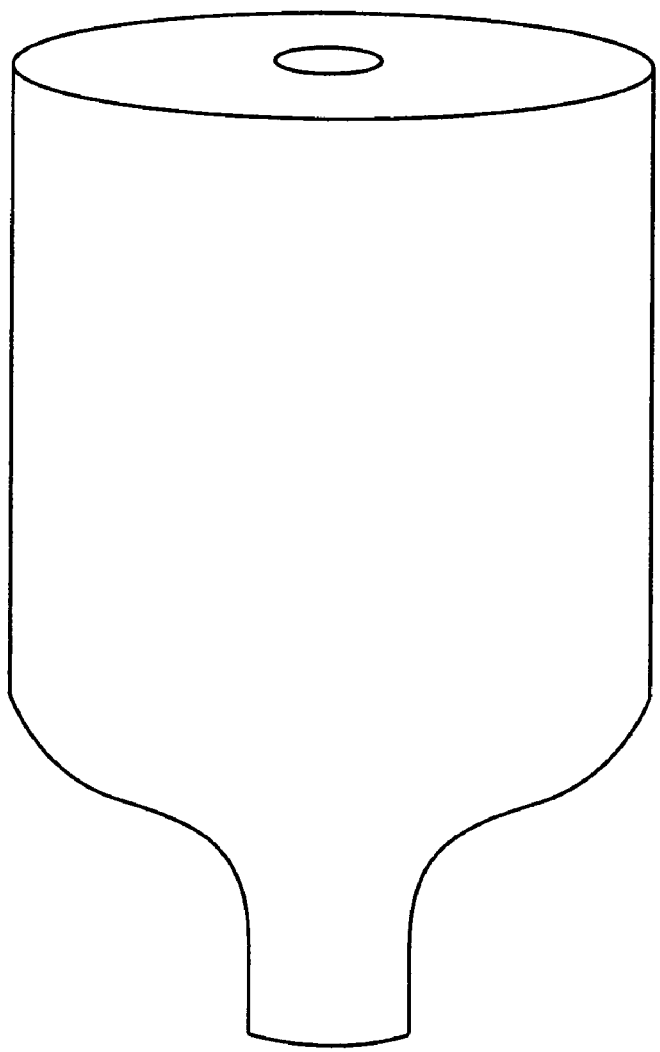
Figure 6A:
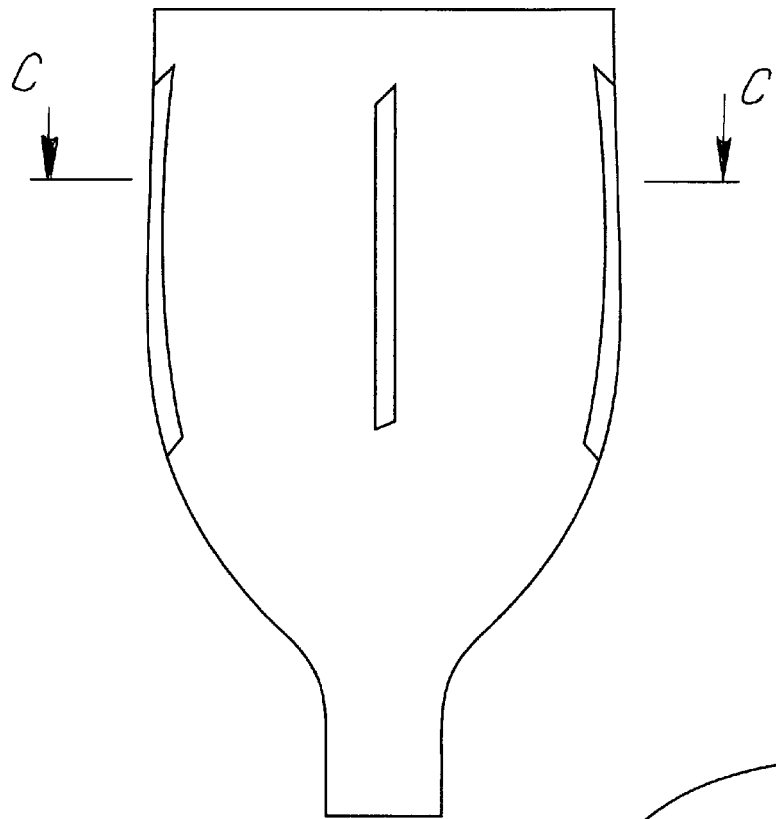
FIG. 6a is a side view of an alternative embodiment of the liner.
Figure 6B:
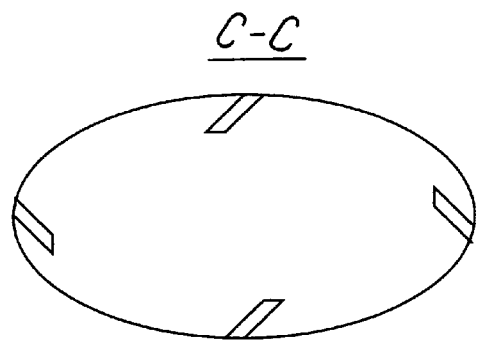
Figure 6C:
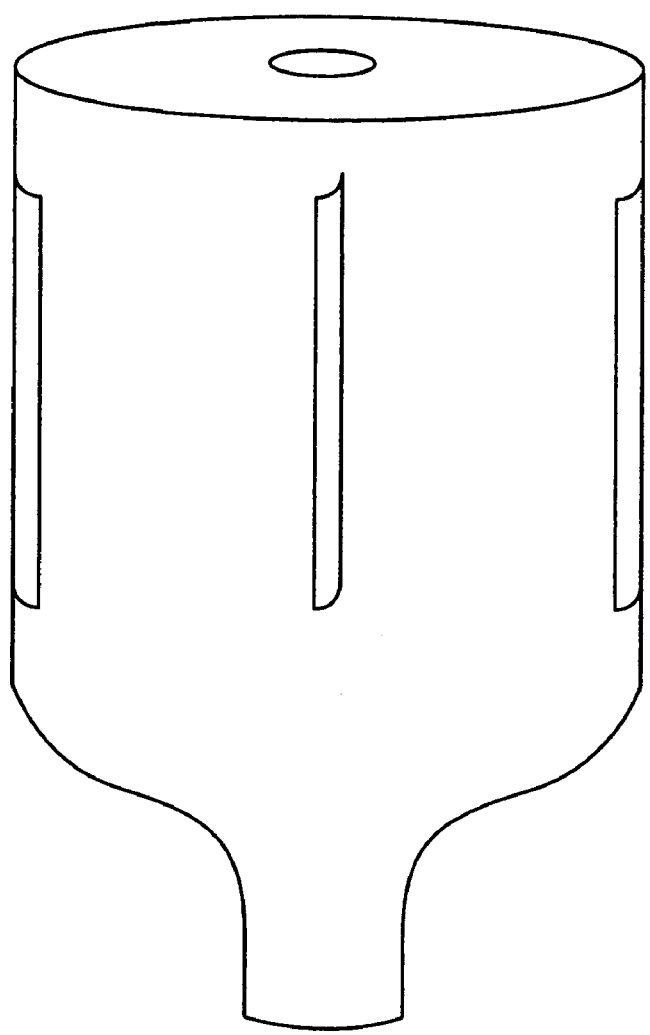
Figure 7A:
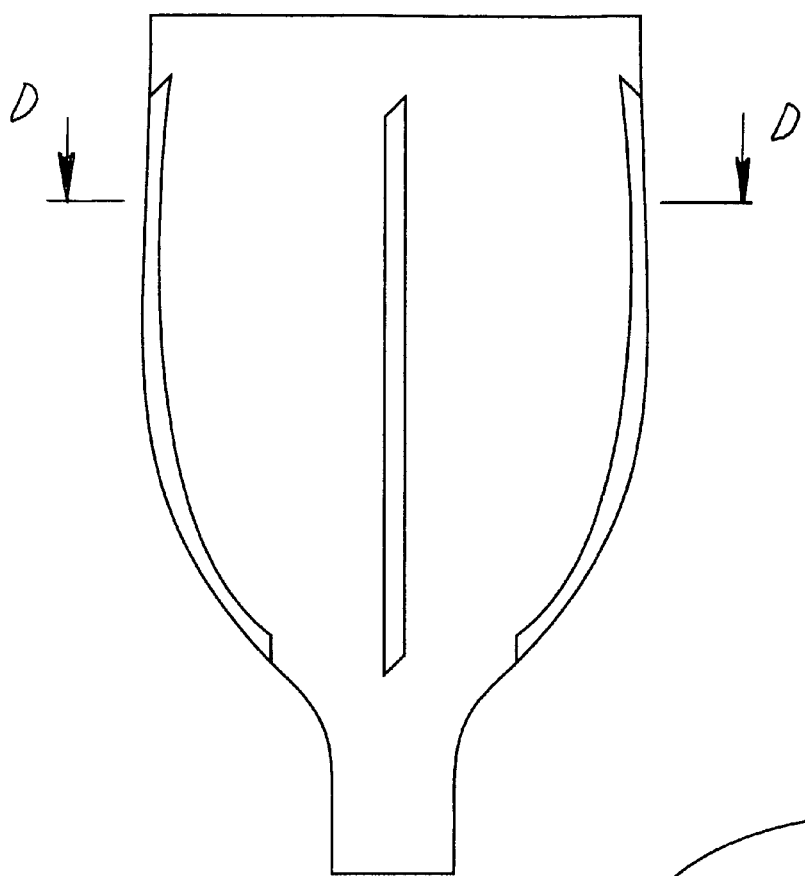
FIG. 7a is a side view of an alternative embodiment of the liner.
Figure 7B:
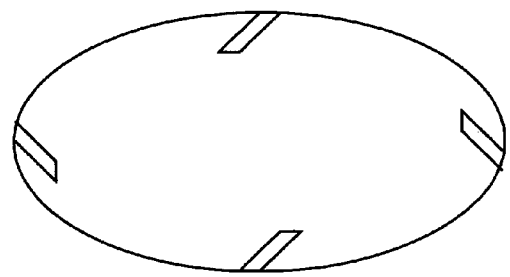
Figure 7C:
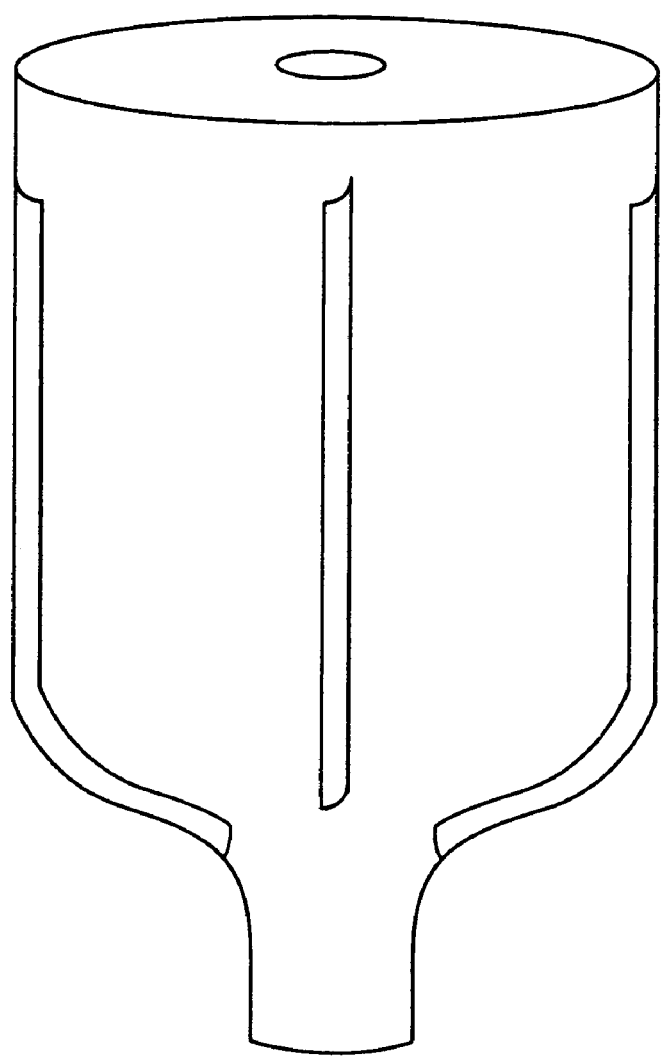
Figures 8A, 8B:
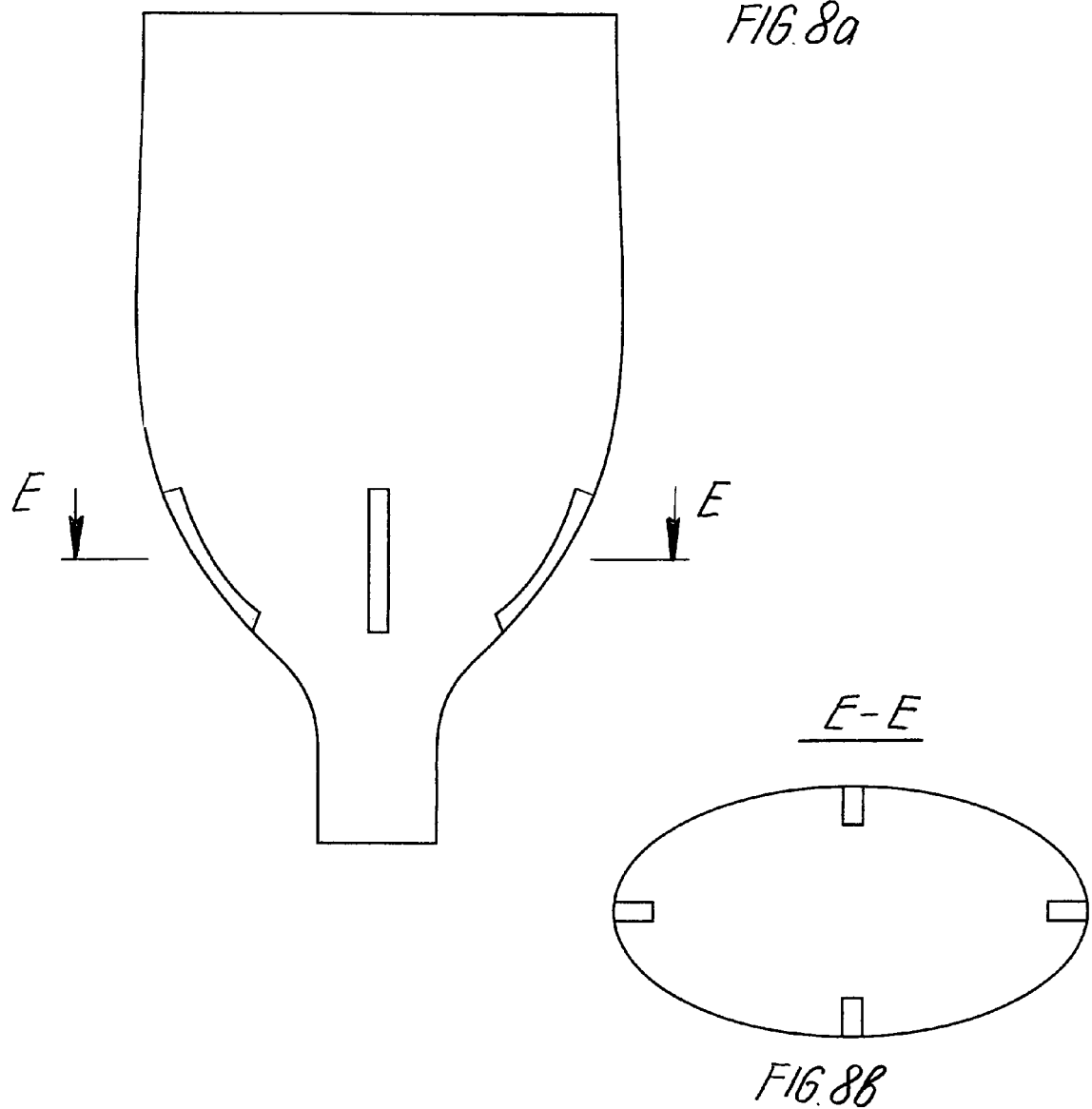
Figure 8C:
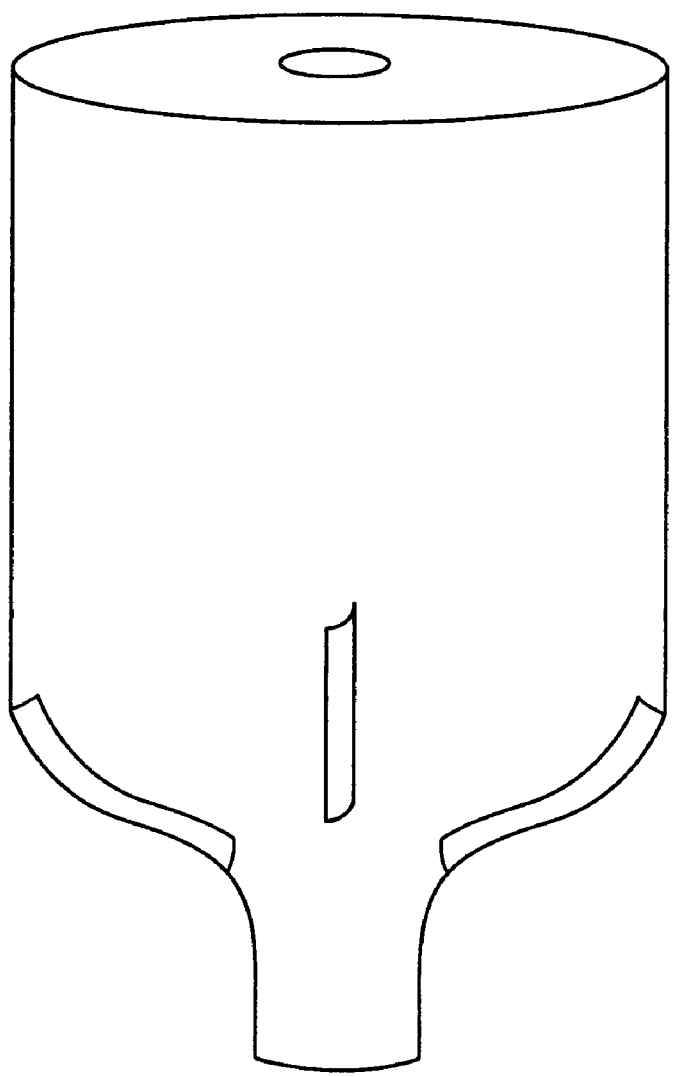
Figures 9A, 9B:
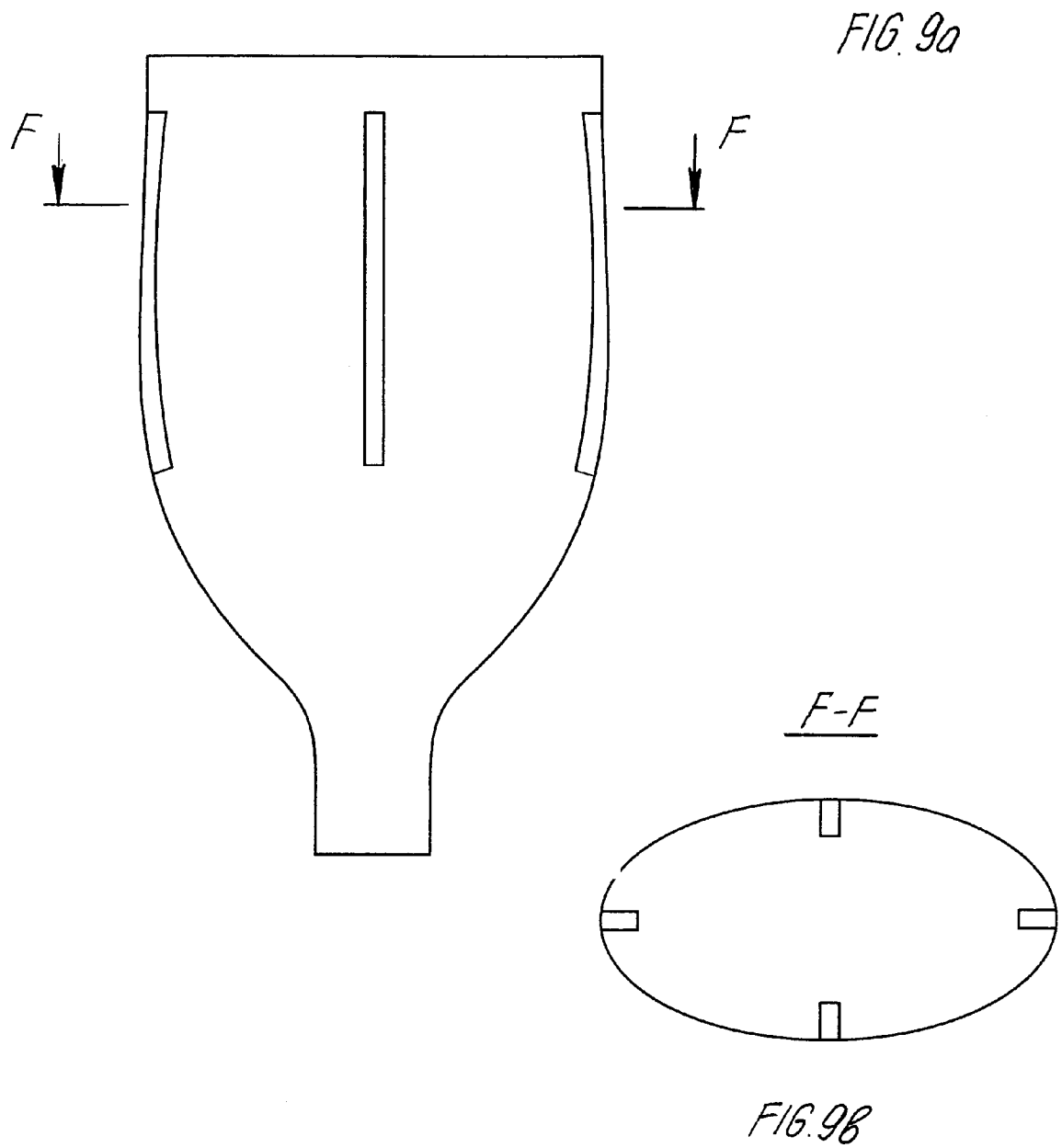
Figure 9C:
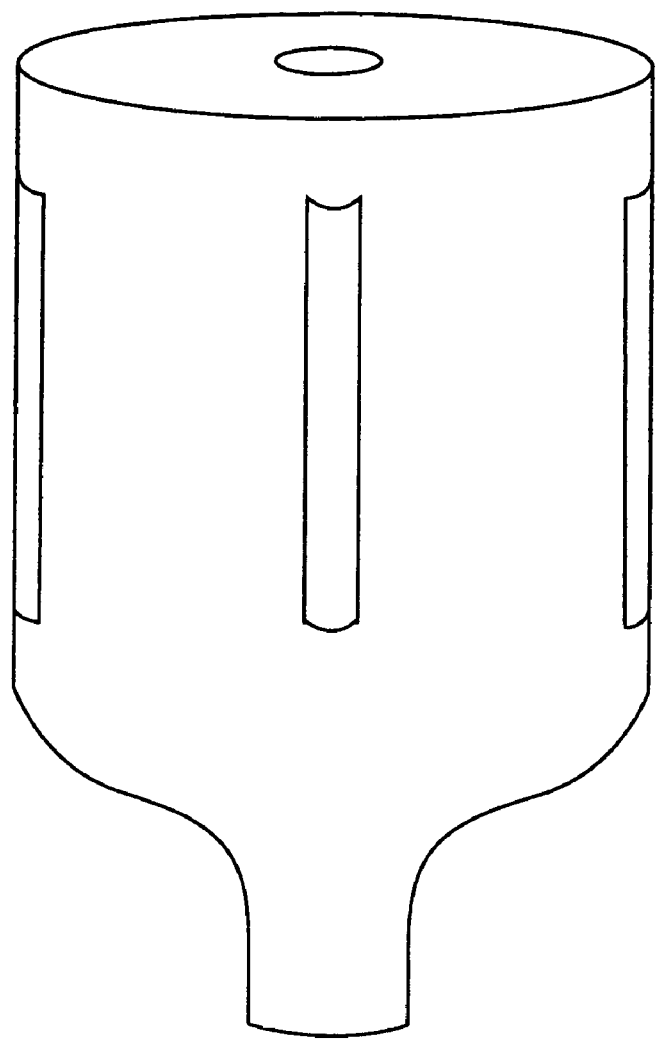
Figure 10A:
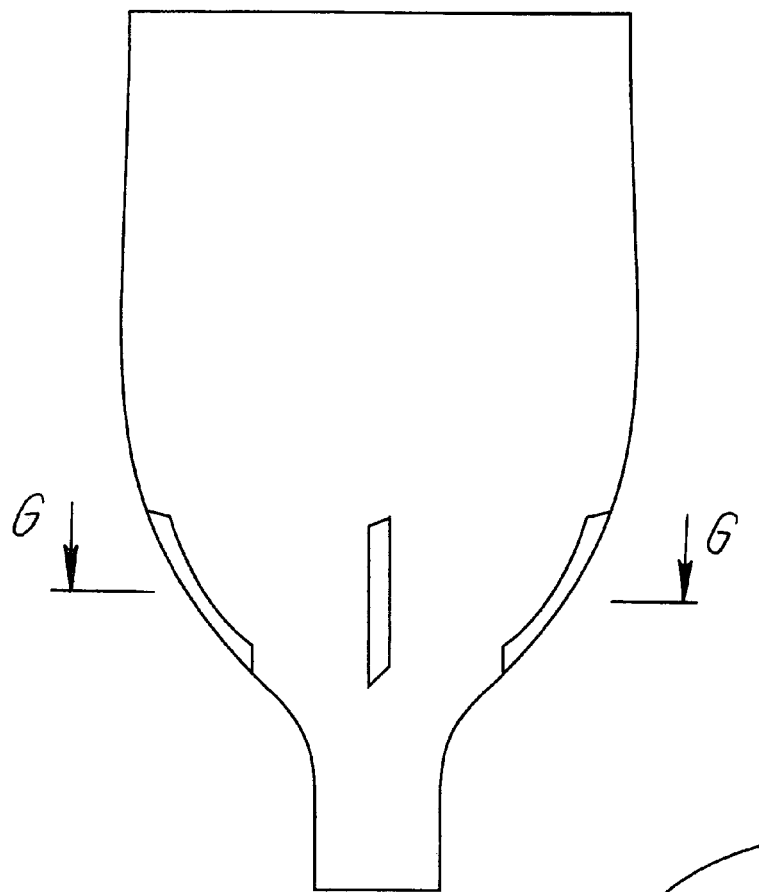
FIG. 10a is a side view of an alternative embodiment of the liner.
Figure 10B:
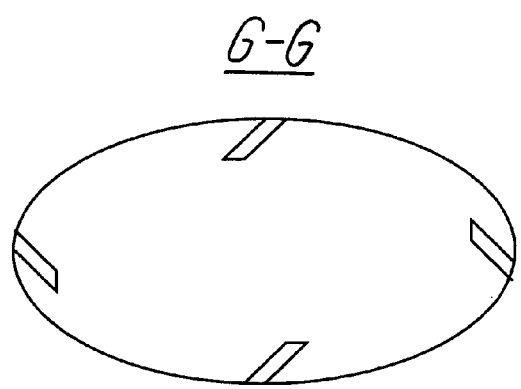
Figure 10C:
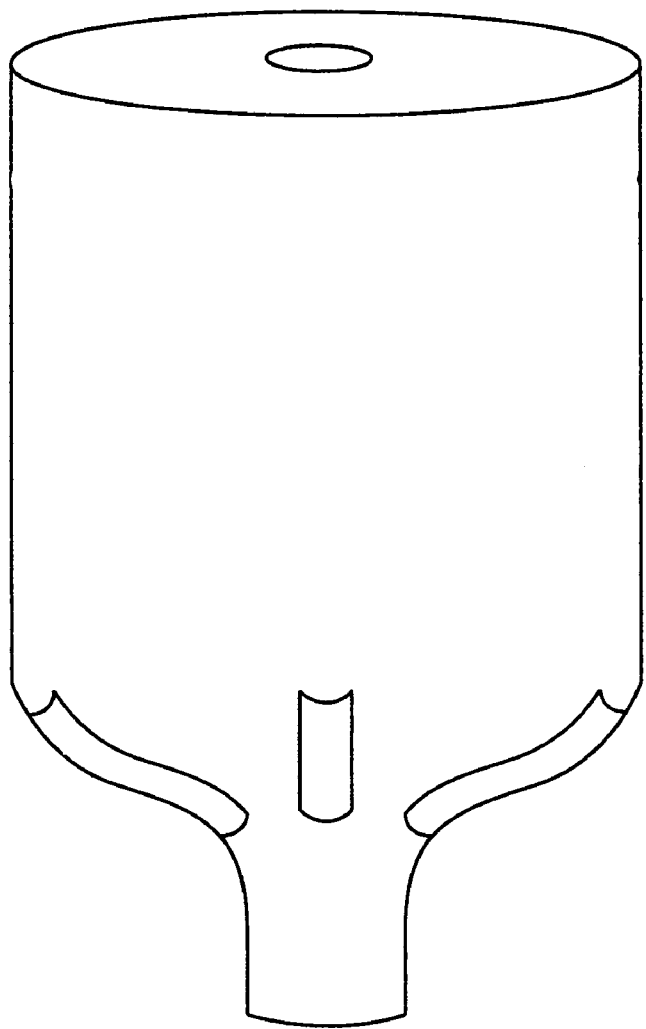
Figure 11A:
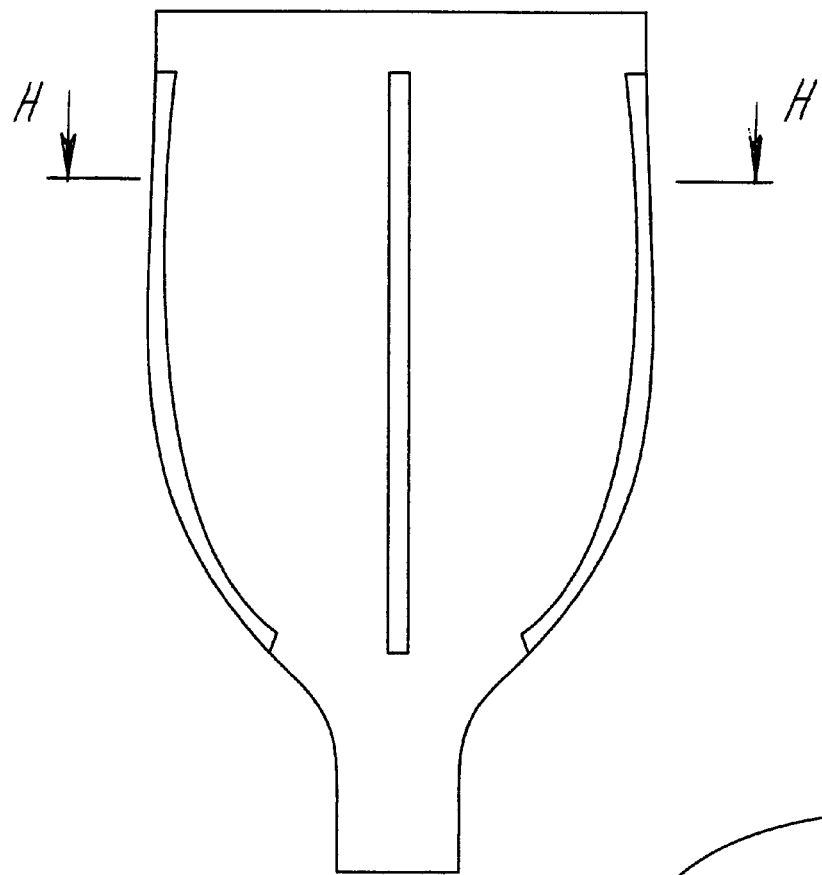
FIG. 11a is a side view of an alternative embodiment of the liner.
Figure 11B:
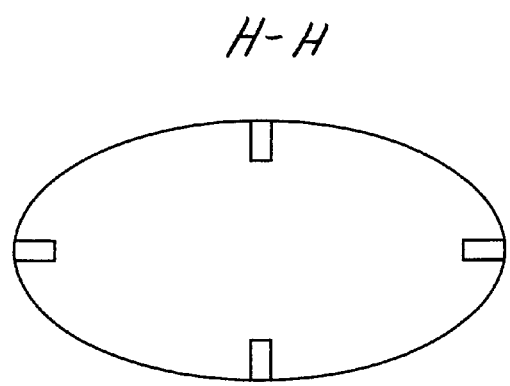
Figure 11C:
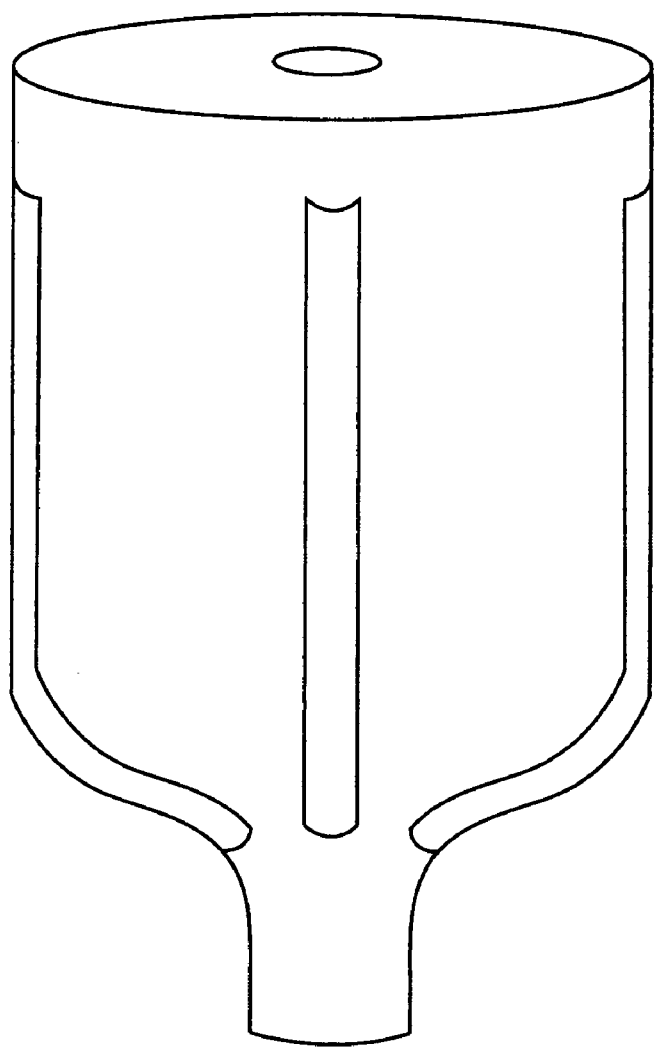
Figure 12A:
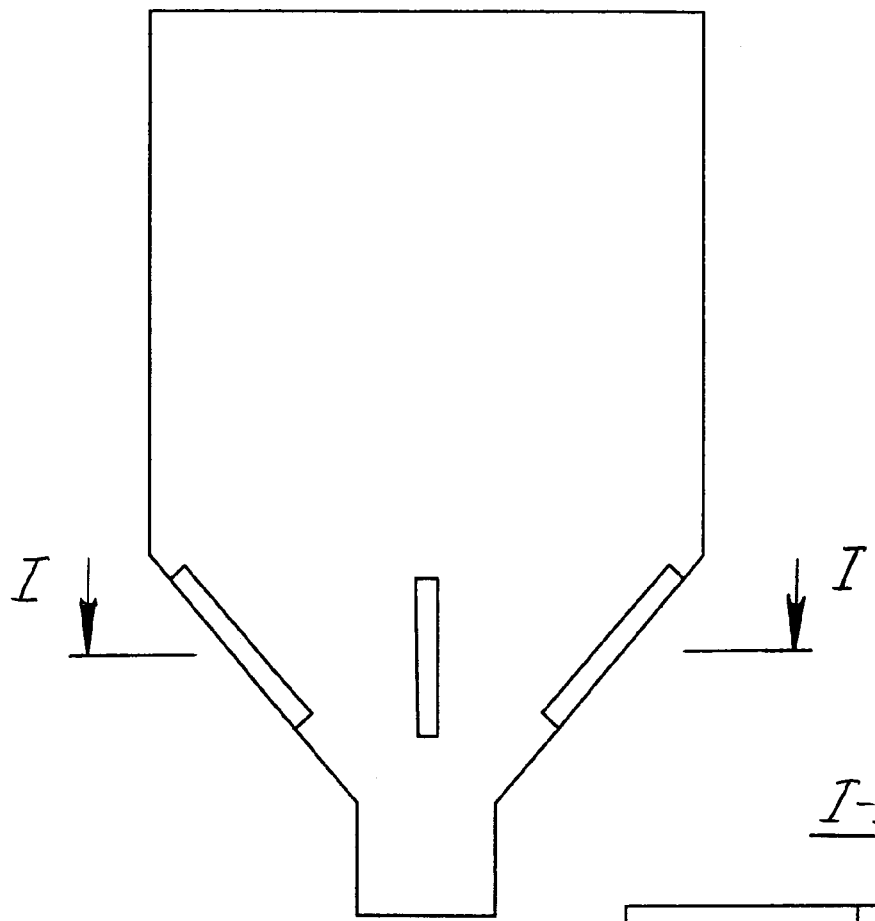
FIG. 12a is a side view of an alternative embodiment of the liner.
Figure 12B:
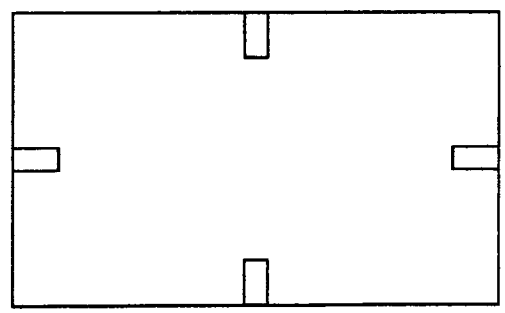
Figure 12C:
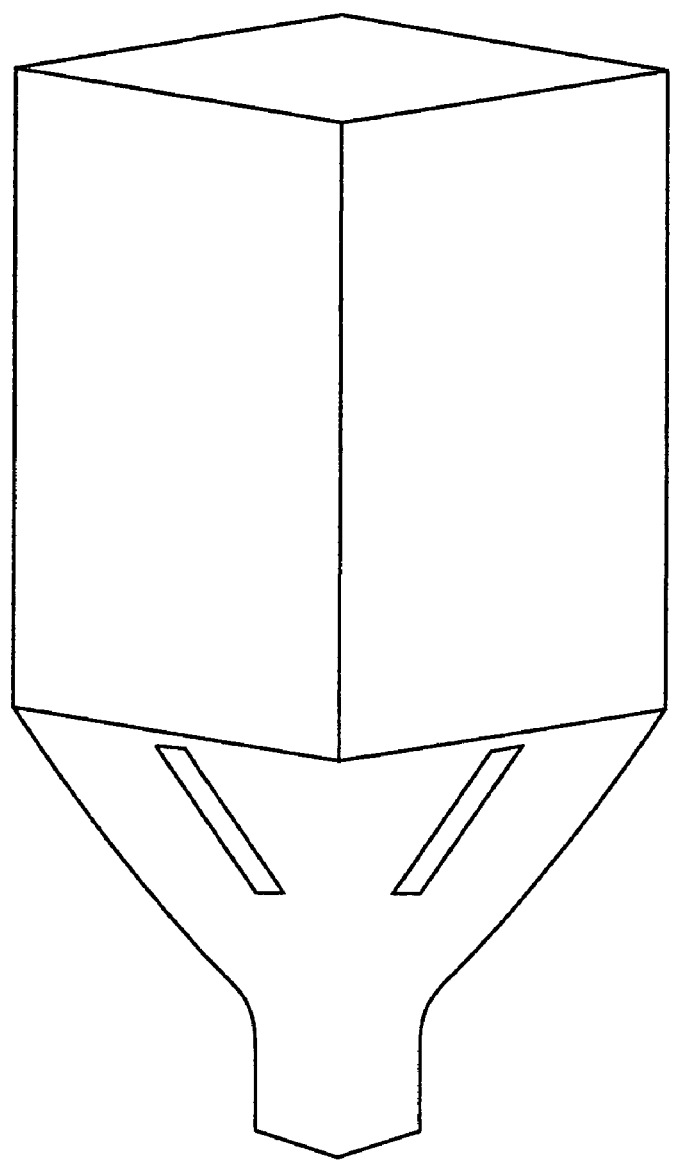
Figure 13A:
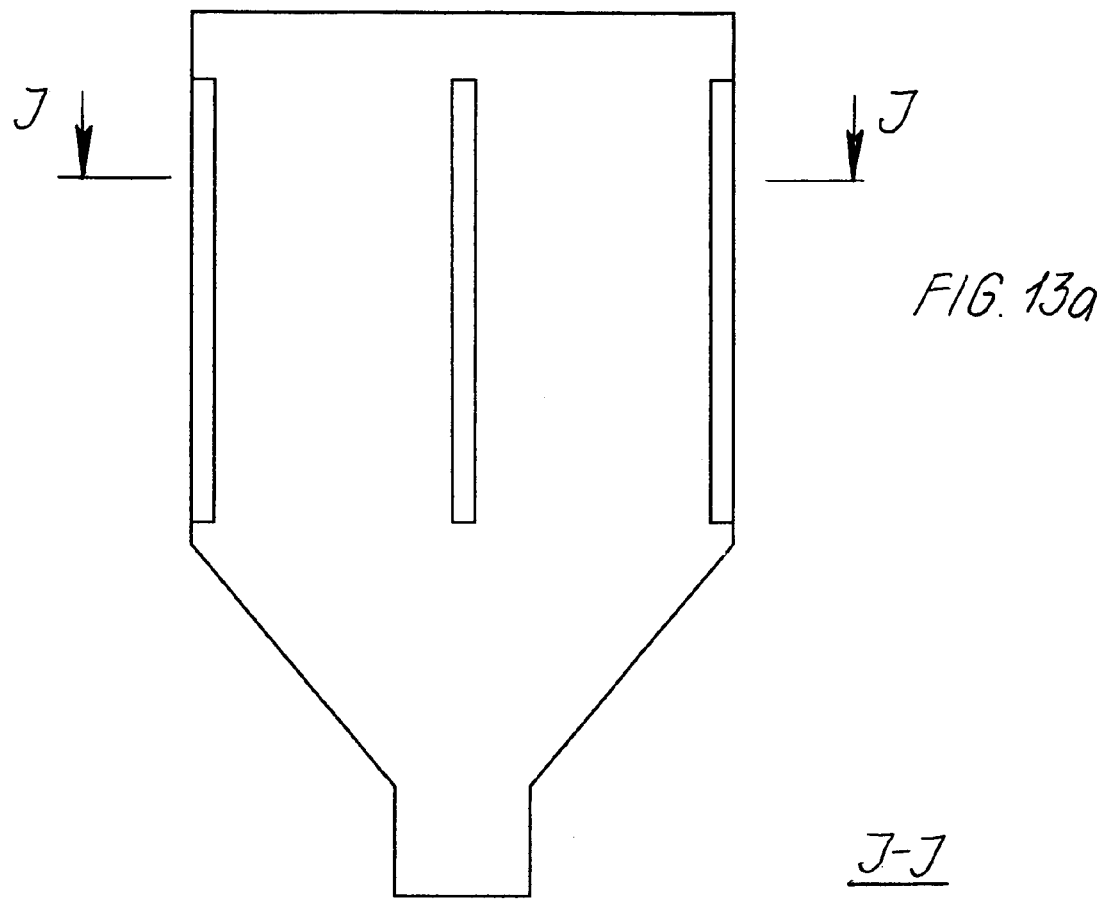
FIG. 13a is a side view of an alternative embodiment of the liner.
Figure 13B:
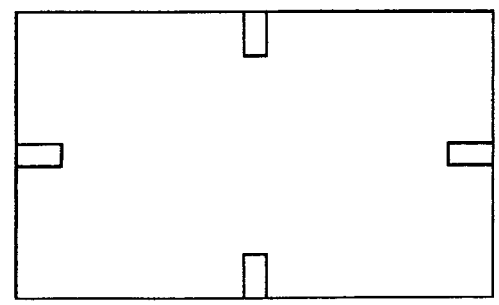
Figure 13C:
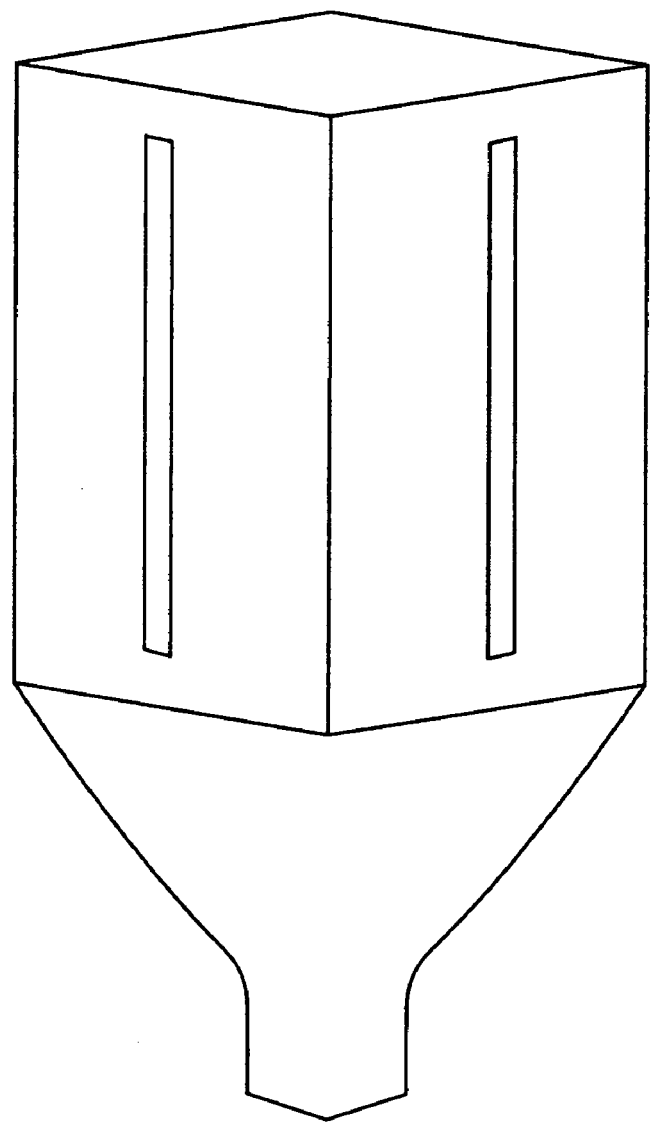
Figure 14A:
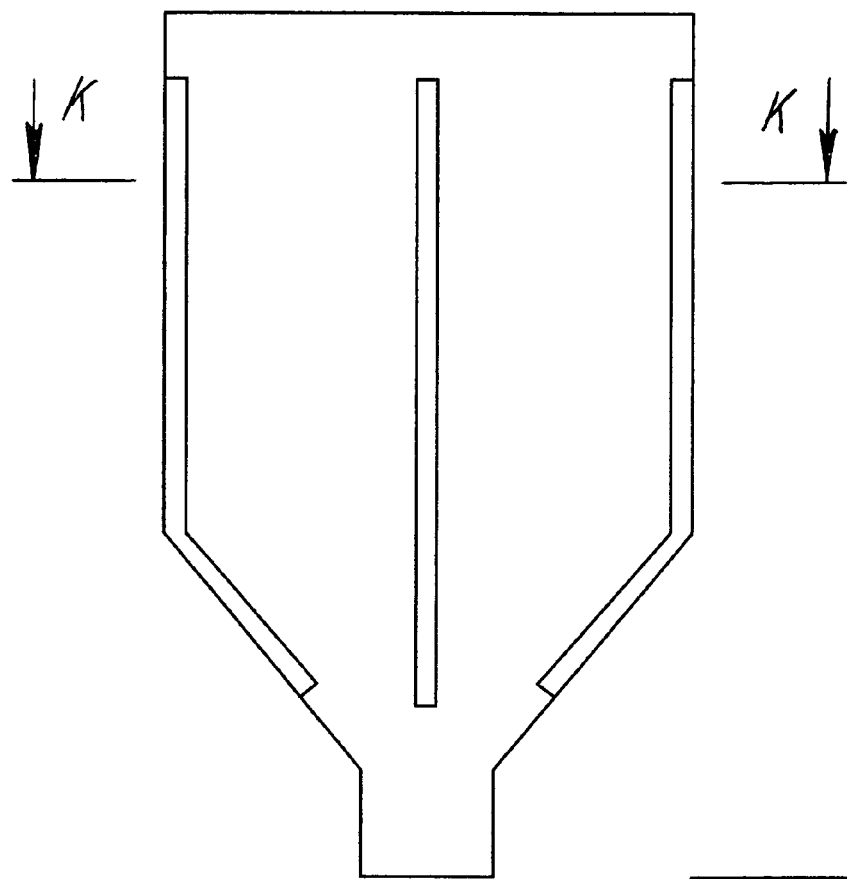
FIG. 14a is a side view of an alternative embodiment of the liner.
Figure 14B:
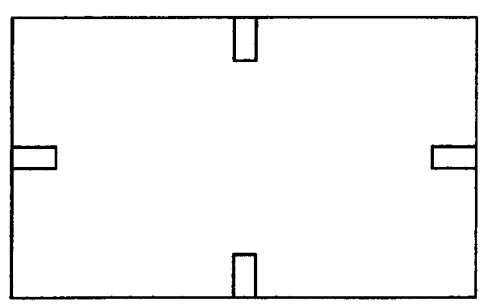
Figure 14C:
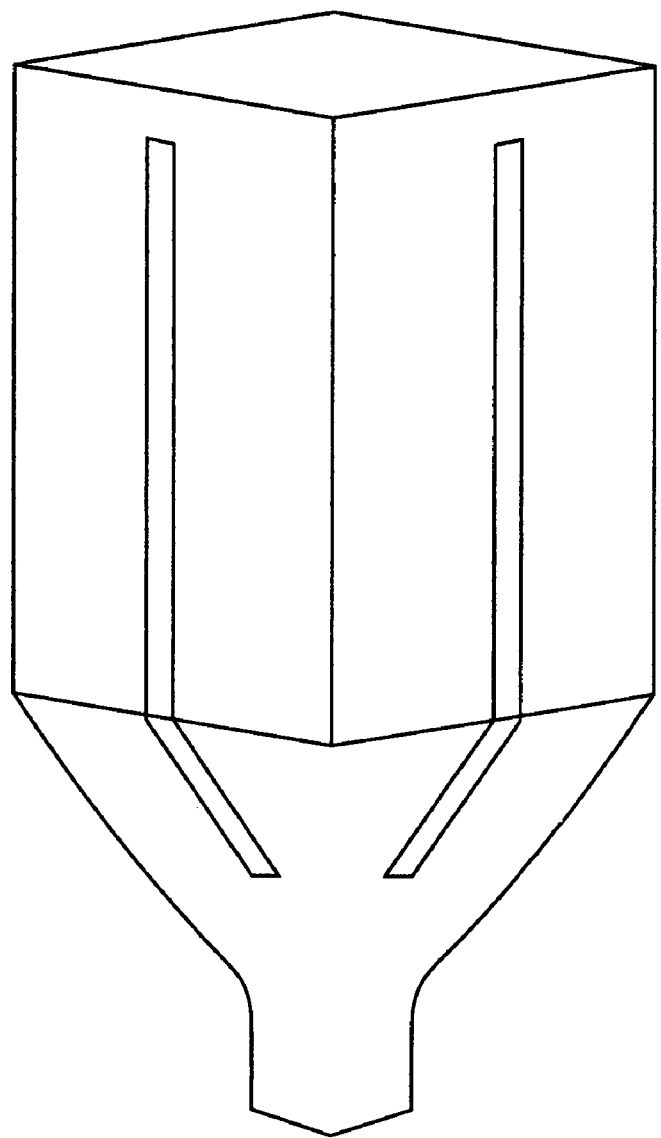
Figure 15A:
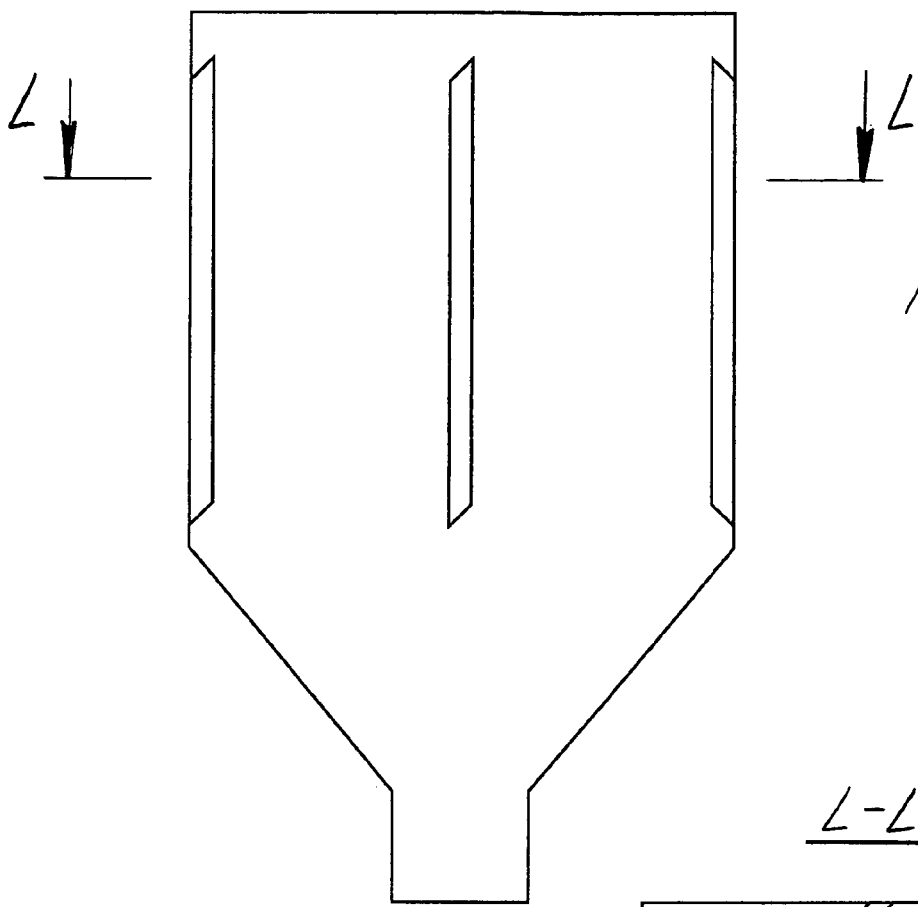
FIG. 15a is a side view of an alternative embodiment of the liner.
Figure 15B:
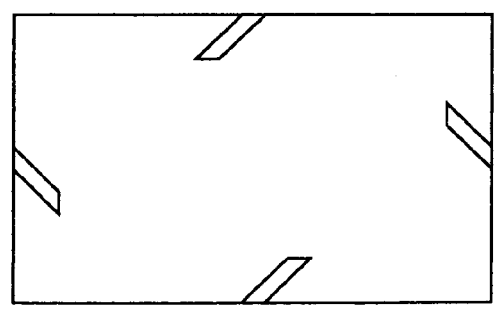
Figure 15C:
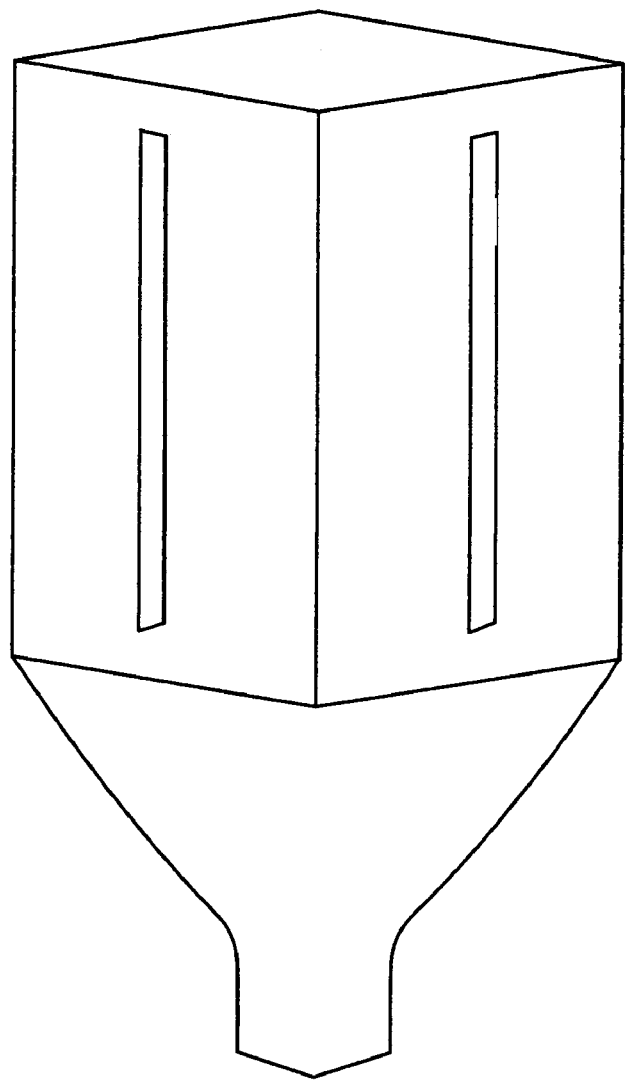
Figure 16A:
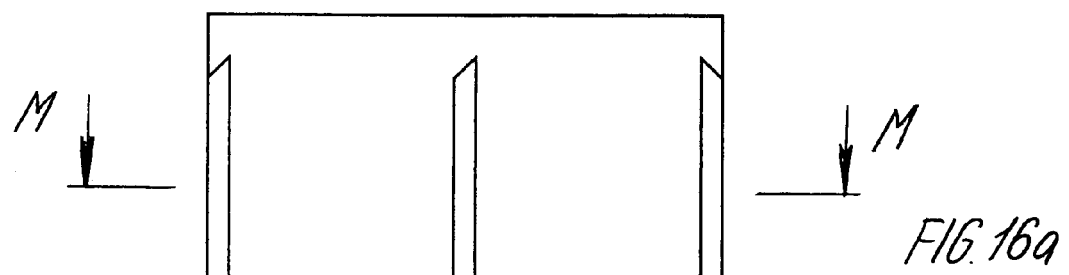
FIG. 16a is a side view of an alternative embodiment of the liner.
Figure 16B:
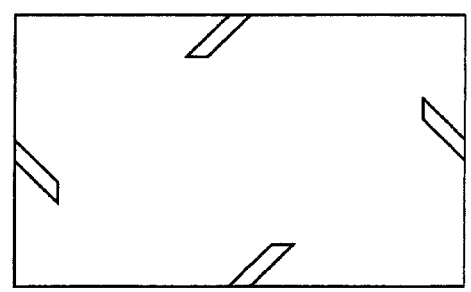
Figure 16C:
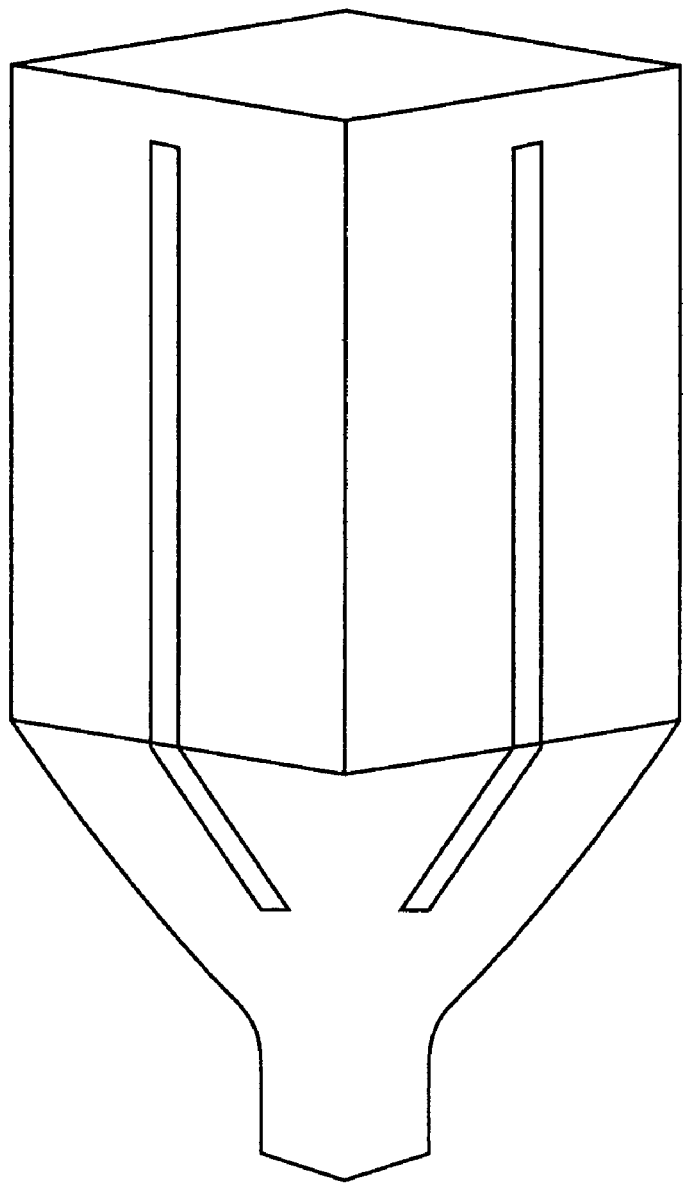
Figure 17A:
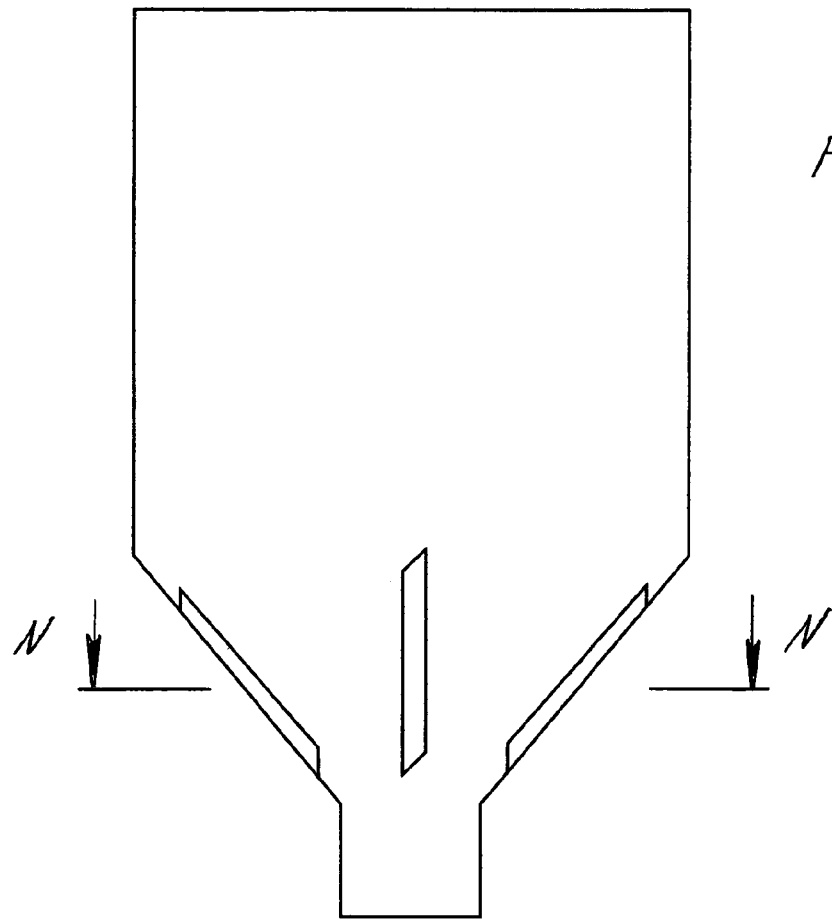
FIG. 17a is a side view of an alternative embodiment of the liner.
Figure 17B:
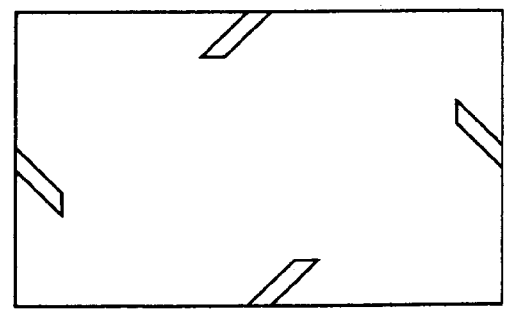
Figure 17C:
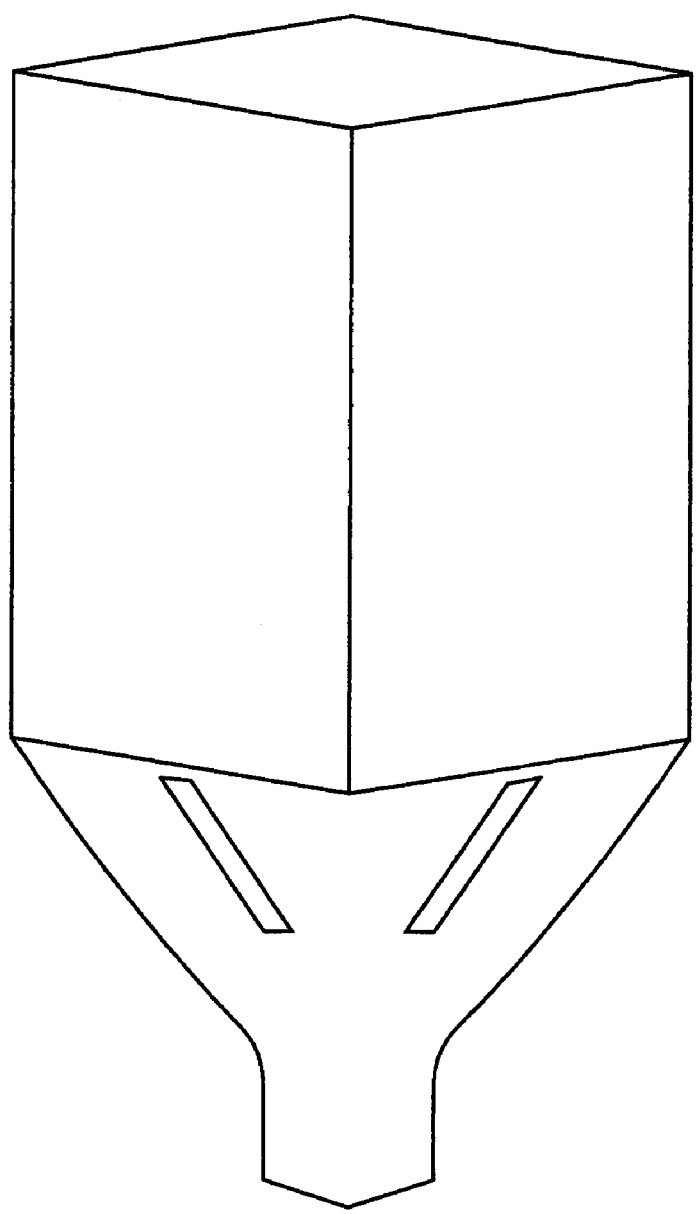

The disposable liner of the present invention is preferably manufactured from a soft plastic such as polyethylene or polypropylene. Typical polyethylenes include high, medium, low, linear low and very low density. Also, polyethylenes that are presently manufactured such as Exact®, Dowlex®, and Attain®, and others made by Union Carbide and Dow Chemical may be used. The liner may also be made from polypropylene and brands of polyethylene and polypropylene as well as other materials. The liner of the present invention may be manufactured as a sheet, a film, a blown film or any other suitable method. The liner is preferably made from a flexible thermoplastic material. As depicted in FIG. 4 through FIG. 5 the liner may be shaped to fit the particular container which may be used to deposit chemicals into another container or it may be free standing i.e. not used with another container. As shown in FIG. 6 through FIG. 17 the liner may be a variety if shapes and configurations and manufactured in such way as to incorporate ribs, fins, baffles or other raised surfaces which may enhance mixing when a sleeve, a container or a liner is rotated. These ribs may be attached to the inner surface of the already existing sleeve, container or liner by any suitable way. Also, the ribs may be integrated into a body of a liner, a sleeve or a container during manufacturing process thereof. In another embodiment, the liner may also be manufactured in such a way to allow for protrusions or individual bumps extending into the vessel, but still provide containment.

Figure 3:
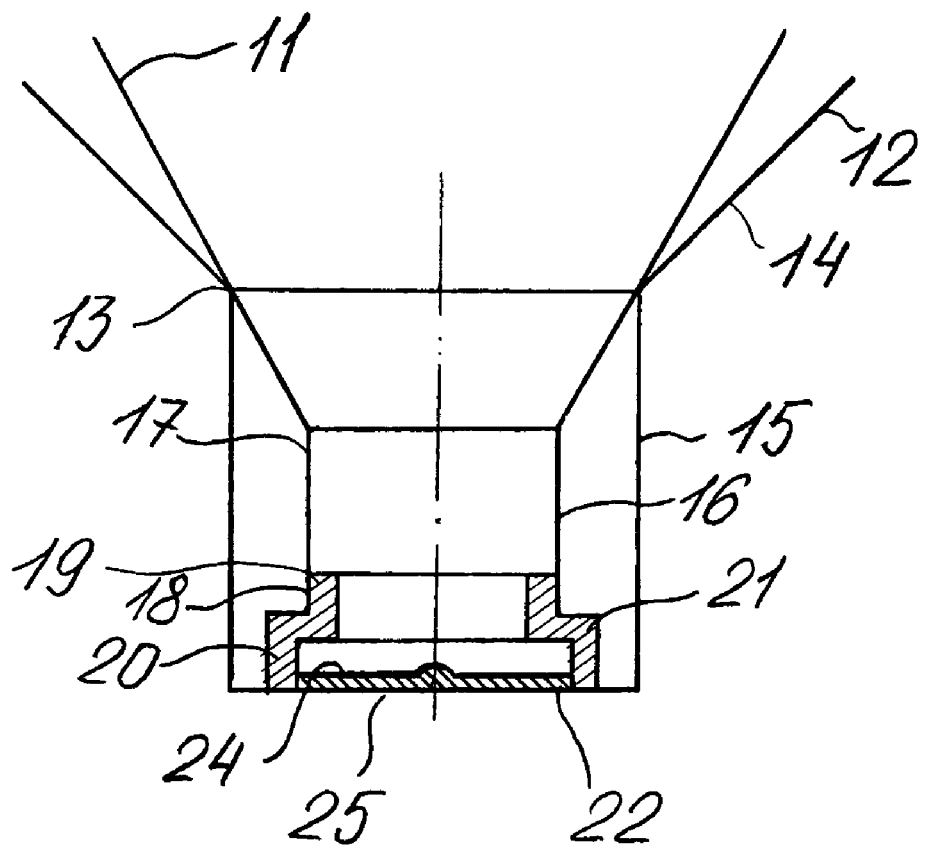
FIG. 3 is a cross-sectional view of the disposable coupling and a portion of the liner of the present invention.

FIG. 3 illustrates the present invention generally shown at 10. In this embodiment, the liner 11 of the present invention is positioned in a hard vessel 12. The hard vessel 12 can have a body (not shown) that narrows to an upper portion 14 and a lower portion 15 separated by a connection 13 to a valve means. Upper portion 14 is typically conical or funnel-shaped, which is preferable in mixing and/or blending elements. Lower portion 15 can be cylindrical or conical. Connection 13 may be fixed or removable, as in the case of a threaded or frictional fit connection. The hard vessel 12 is not necessary to the present invention and need not be present for its operation.

The liner 11 can pass through the opening in the valve means or other opening in the container. The liner 11 can have a connecting sleeve 16. Connecting sleeve 16 can be manufactured from the same material as liner 11, simply as an extension thereof or made from another material preferably a plastic material that is capable of being incinerated for disposal purposes. Connecting sleeve 16 can have an upper portion 17 and a lower portion 18. Upper portion 17 can be a transition point of liner 11, wherein liner 11 goes from, in one embodiment, a conical shape to a cylindrical shape. Lower portion 18 can provide an attachment point for the upper valve member 19. Upper valve member 19 preferably is made of plastic with a greater stiffness than liner 11. The upper valve member may be secured to the liner or removably attached thereto. The liner is preferably a plastic material so that it is disposable as well, preferably by incineration. Fixation of connecting sleeve 16 to upper valve member 19 can be by, for example, heat sealing or mechanical means, such as a locking collar or tie fastener.

Upper valve member 19 can be defined by a housing 20. Housing 20 is preferably, but not limited to, a cylindrical side wall 21. The upper valve 22 can be located at and in the same plane as a bottom surface 23 of the housing 20. The upper valve 22 can have a generally flat upper surface 24 and a generally flat lower surface 25. The lower surface 25 preferably never contacts the mixture within the liner 11. The upper surface 24 can retain the mixture within the housing, connecting sleeve and liner.

In operation, the upper valve member 19 can be releaseably sealed to a lower valve member (not shown). In this manner, the lower surface 25 of upper valve 22 can compress against an upper surface of a lower valve, forming a split valve in which neither of the compressed surfaces become contaminated by the mixture/composition being transferred. The embodiment and operation of a split valve is described in detail in U.S. Pat. No. 5,540,266 the disclosures of which are incorporated herein by reference.

Figure 23:
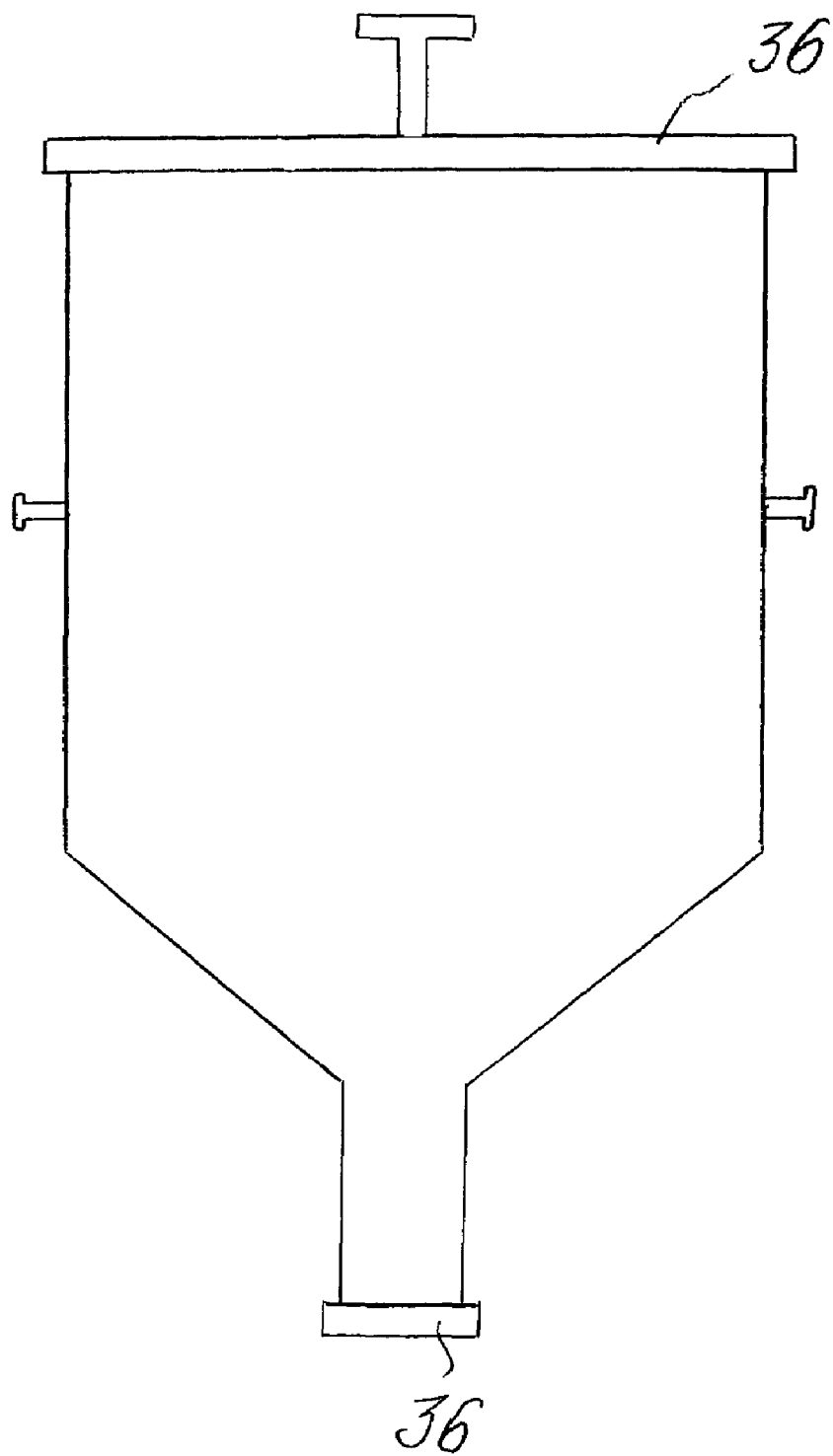
FIG. 23 is a view of a disposable container with covers and handles.
Figure 26:
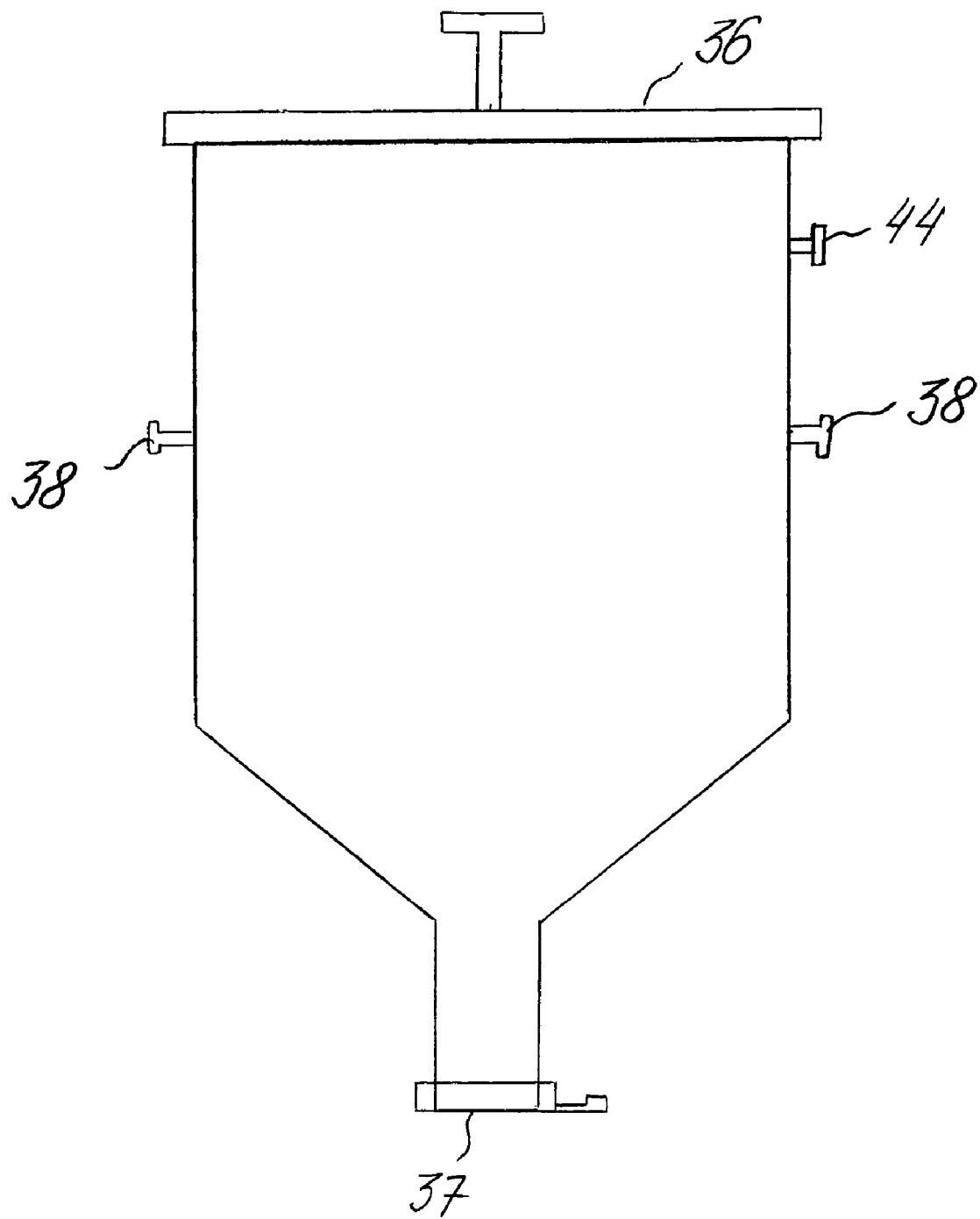
FIG. 26 is a view of a disposable container with a valve, handles and cover.

In one embodiment, the liner is a pouch having a length and a width and which is sealed about its perimeter. In the embodiment, as shown in FIG. 3, the liner may be self-contained with an inner surface and an outer surface. When the chemical is within the liner, it may contact the inner surface. Also, the liner may be of such a size and shape to fit within a container which will be used to deposit chemicals into another container. Also, the liner may have a venting means which will allow air to flow in when the chemical is being drained from the liner and/or allow for deflation of the liner after processing. The venting means is preferably a filter which is permeable to air but impermeable to chemical particles and fumes. In this embodiment, the liner may have a cap 36 over a orifice or an opening, as shown in FIG. 23. When the liner is being filled or emptied, the cap can be removed. When the liner is being transported or stored, the cap can provide an airtight seal for the contents of the liner. In an alternative embodiment, the cap can be a check valve or inflation port 44 as shown in FIG. 26, which can allow gas to be pumped in. This embodiment may also contain a check valve to prevent gasses or vapor from escaping. Such gas can be an element to be mixed, a catalyst for mixing, a means to seat the liner or pouch in the container or vessel, or simply to facilitate blending or forcing out the mixture.

Figure 22A:
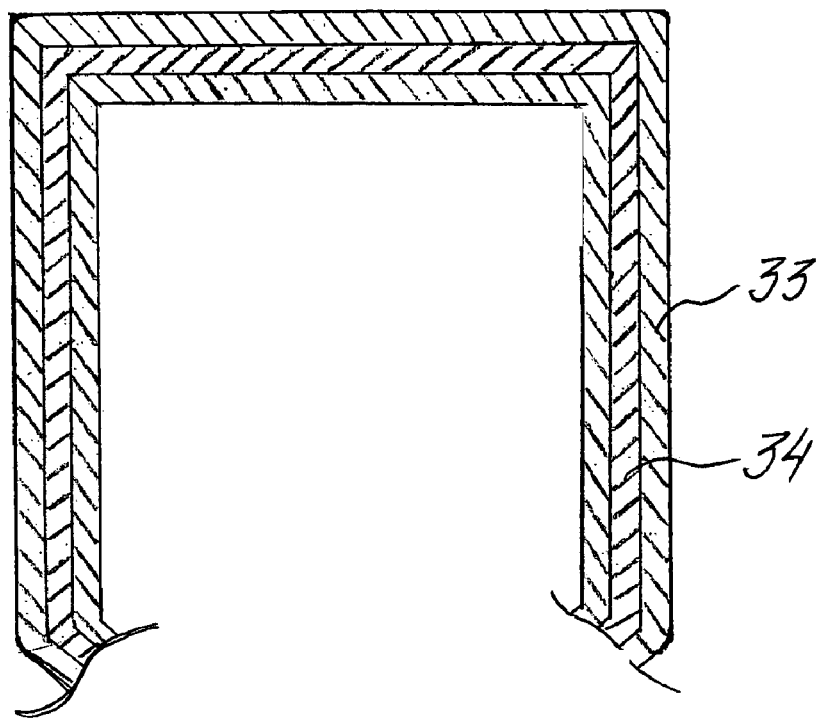
FIG. 22a is a cut-away view of portion of a multi-layer liner.
Figure 22B:
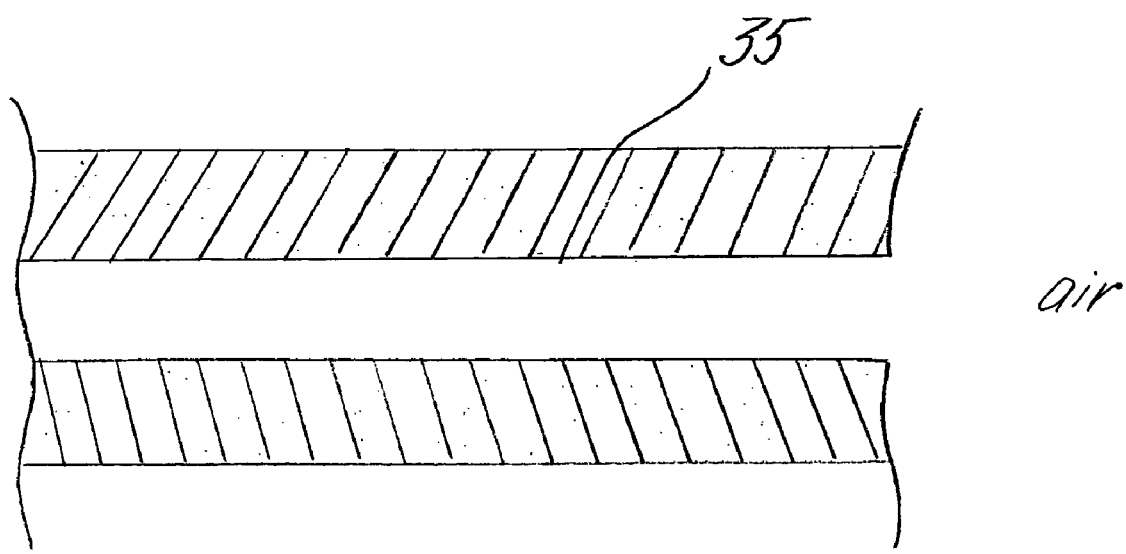
FIG. 22b is a cut-away view of an alternative embodiment of a multi-layer liner where the inner and outer layers are separated by a layer of air.

As shown in FIG. 22a and FIG. 22b, in one embodiment a liner may have at least one layer and in some applications two or more layers. As shown in FIG. 22b, a layer of an air 35 or any other gas may be sandwiched between outer and inner layers to provide shape to the liner and for the walls of the liner to be positioned toward the inner wall surface of the container. Another embodiment may have an oxygen-barrier and/or a moisture-barrier layer 34 between the outer and inner layer, such barrier layers include PVDC (polyvinylidene chloride) and EVOH (ethylenevinyl alcohol) and others. Adhesive layers between the outer layers and the core barrier layer may also be included. A configuration with barrier layer may be necessary in order to have a liner with a layer which may protect the contents of the liner from atmospheric oxygen or water vapor and to keep moisture from passing through walls of such liner. The moisture barriers may also keep moisture in the liner thereby providing a fresher product. If multi-layer embodiment of lining is utilized, it is preferred that the outer layer 33 as shown in FIG. 22a is made from a polyethylene or polypropylene Tyvek®. This polyethylene fiber material is lightweight, strong, vapor-permeable, water-, chemical-, puncture-, tear-, and abrasion-resistant.

In another embodiment, the liner may be a conical or cylindrical sheet. In this embodiment, the liner may be defined by an open upper portion, a side surface, and an open lower portion. Preferably, the liner may take generally the final shape of a typical container. However, the liner may be deformable to take the shape of any container as shown in FIG. 4a through FIG. 5c.

As seen in FIGS. 4-17, the liner 60 may have a body portion 61 with a base 62 and side walls 63 and 64. Although the body is shown with the base 62 at right angles to the side walls, any shape is suitable. The side walls have one end adjacent to the base 62. The opposite end of the side wall is secured to the breast 65 which is generally conical or pyramidal in shape. The breast ends in a neck 66 which has an orifice which may be used for receiving or discharging product. Alternatively, there may be another opening for receiving product.

One or more baffles may be present in the liner. The liner may have a variety of shapes depending on the shape of the vessel into which it is positioned. In a preferred embodiment, the liner is placed loosely in the vessel and air is entrained into the liner through an intake orifice whereby the air pressure forces the outside walls of the liner into contact with the inside wall of the vessel. If air is not used, a volume of product that is to be blended, stored or transported may provide the outward pressure to force at least a portion of the liner into contact with an inside surface of the vessel. The liner is disposable and can be removed from the vessel whereupon it may be incinerated under appropriate conditions to prevent material in the liner from contacting the outside air or persons working in the area. The valve may be made from a flexible or rigid plastic material so that it may also be incinerated for disposal purposes.

Figure 19A:
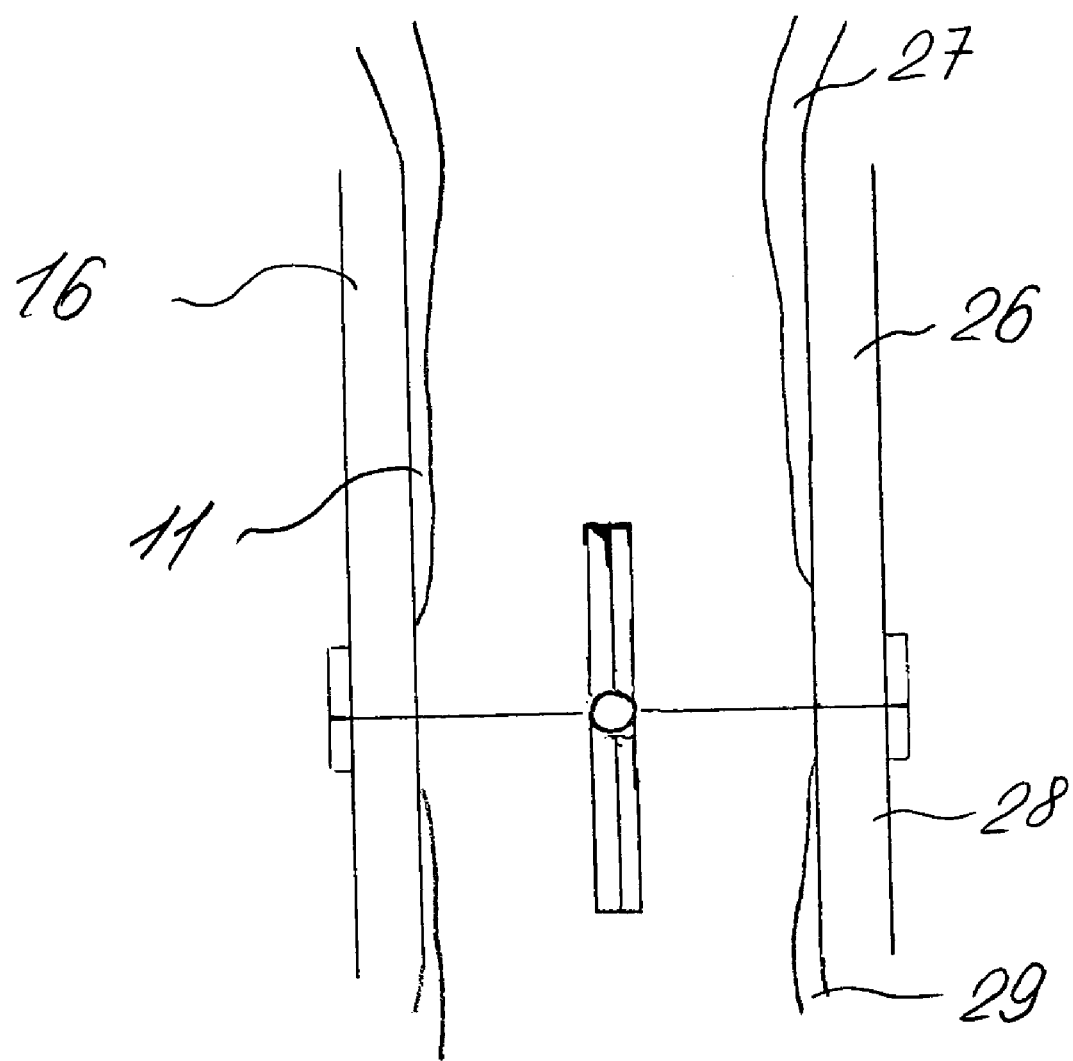
FIG. 19a is a cut-away view of an alternative embodiment of a sleeve and a liner where the split valve is in an "open" position.
Figure 19B:
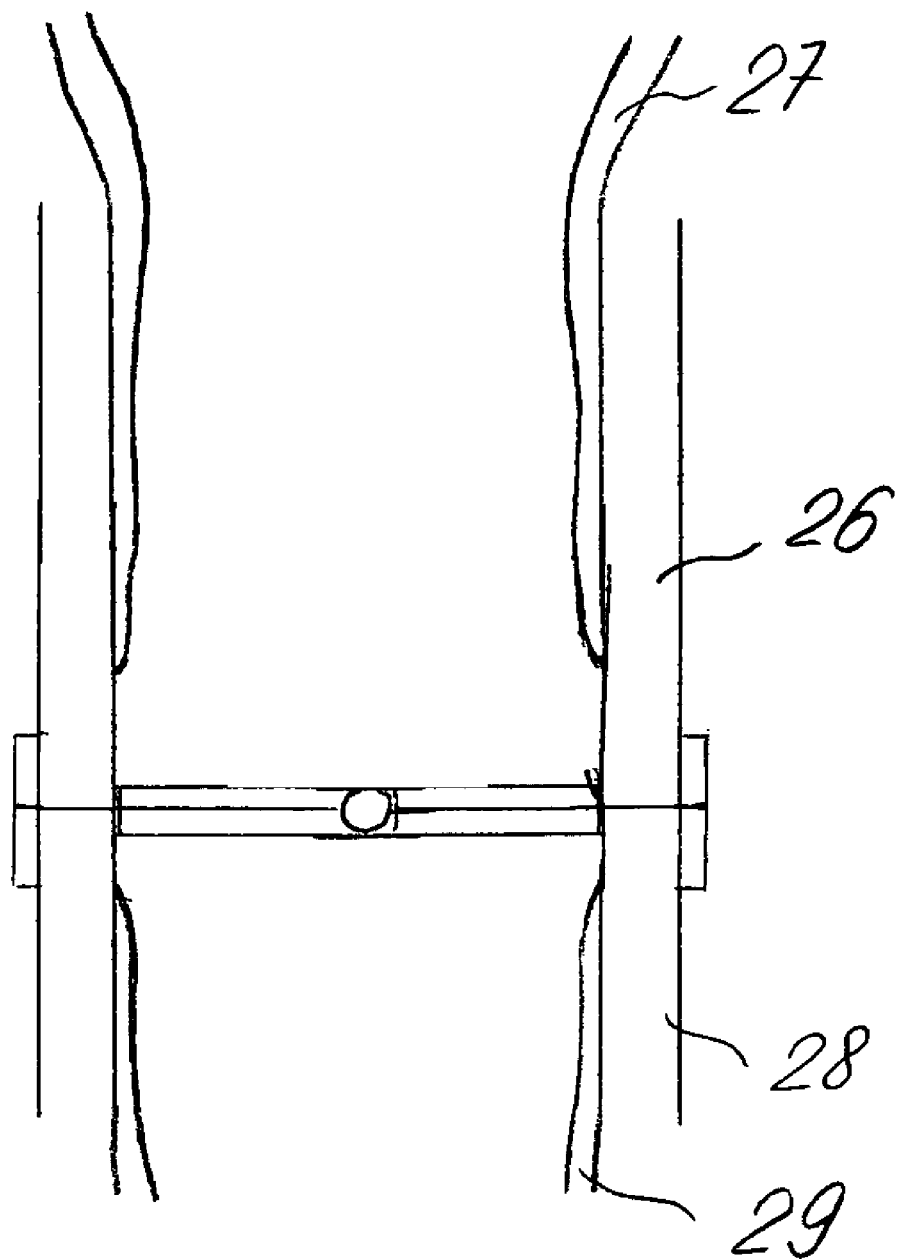
FIG. 19b is a cut-away view of an alternative embodiment of a sleeve and a liner where the split valve is in a "closed" position.
Figure 20A:
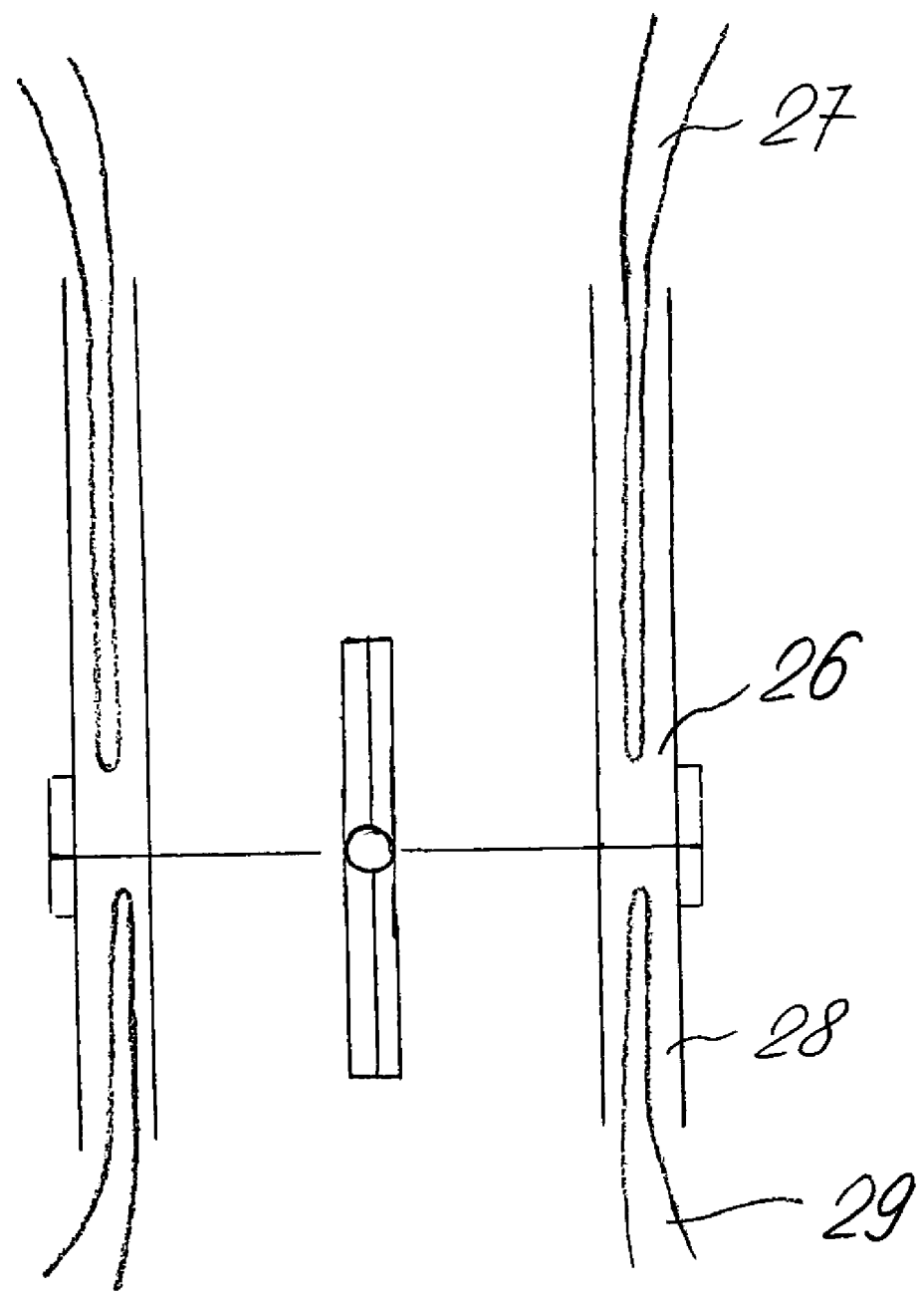
FIG. 20a is a cut-away view of an alternative embodiment of a sleeve and a liner shown in FIG. 20a where the split valve is in an "open" position.
Figure 206:
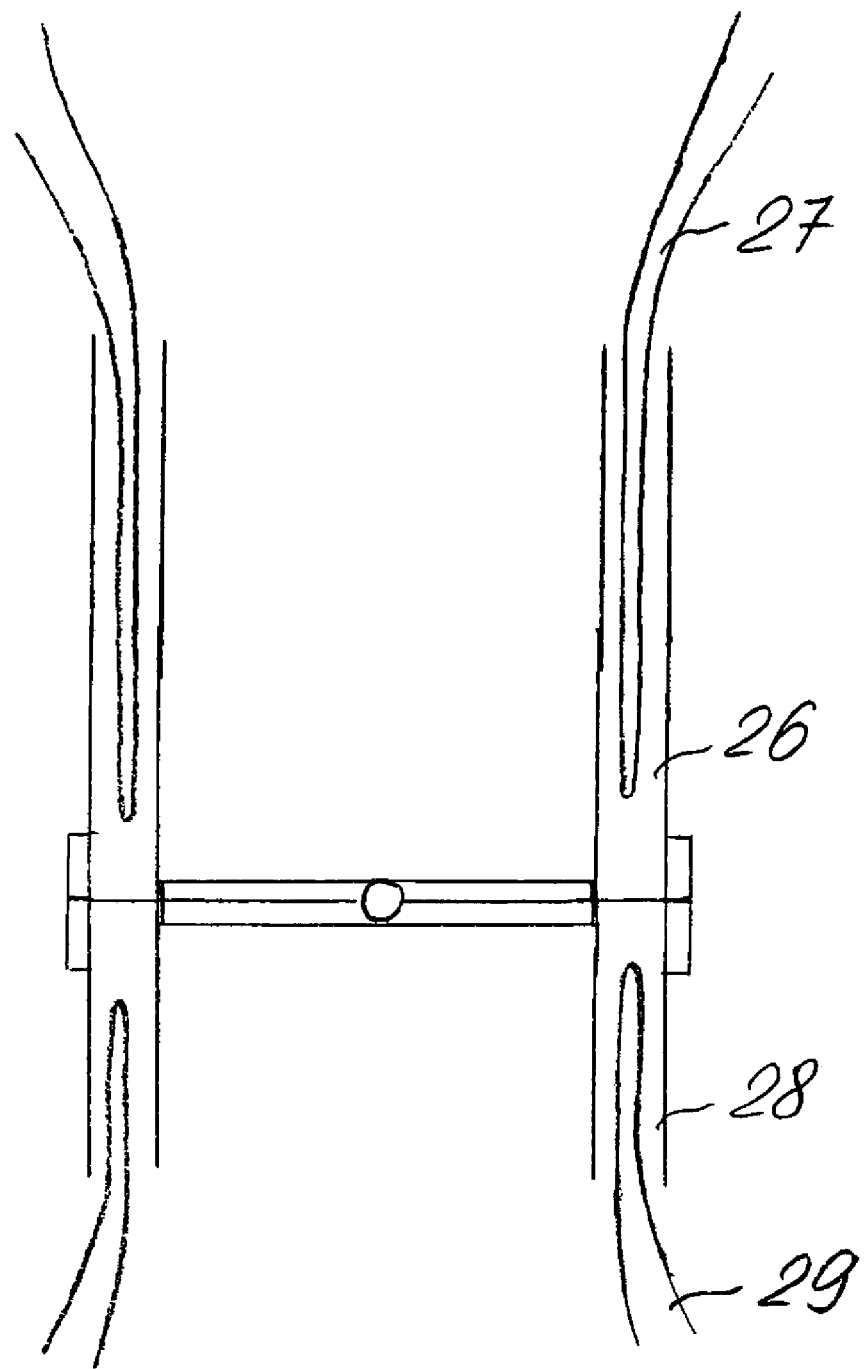
Figure 21A:
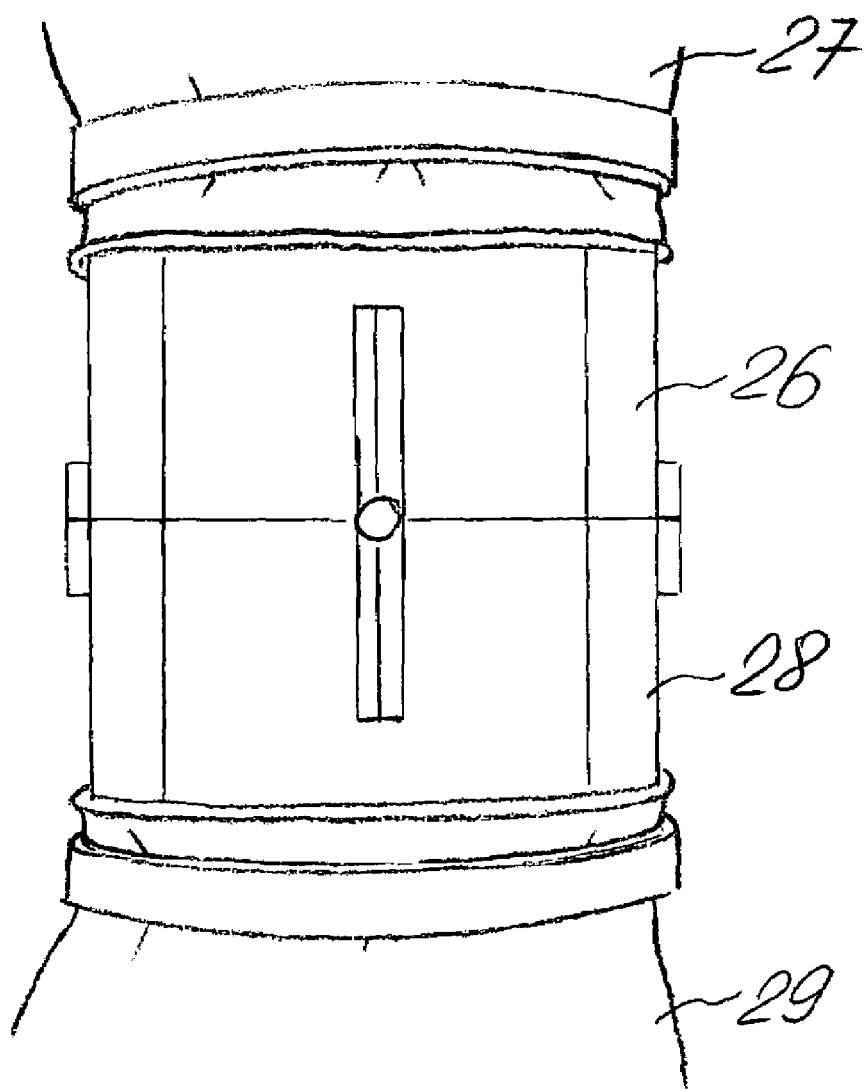
FIG. 21a is a cut-away view of an alternative embodiment of a sleeve and a liner where the split valve is in an "open" position.
Figure 21B:
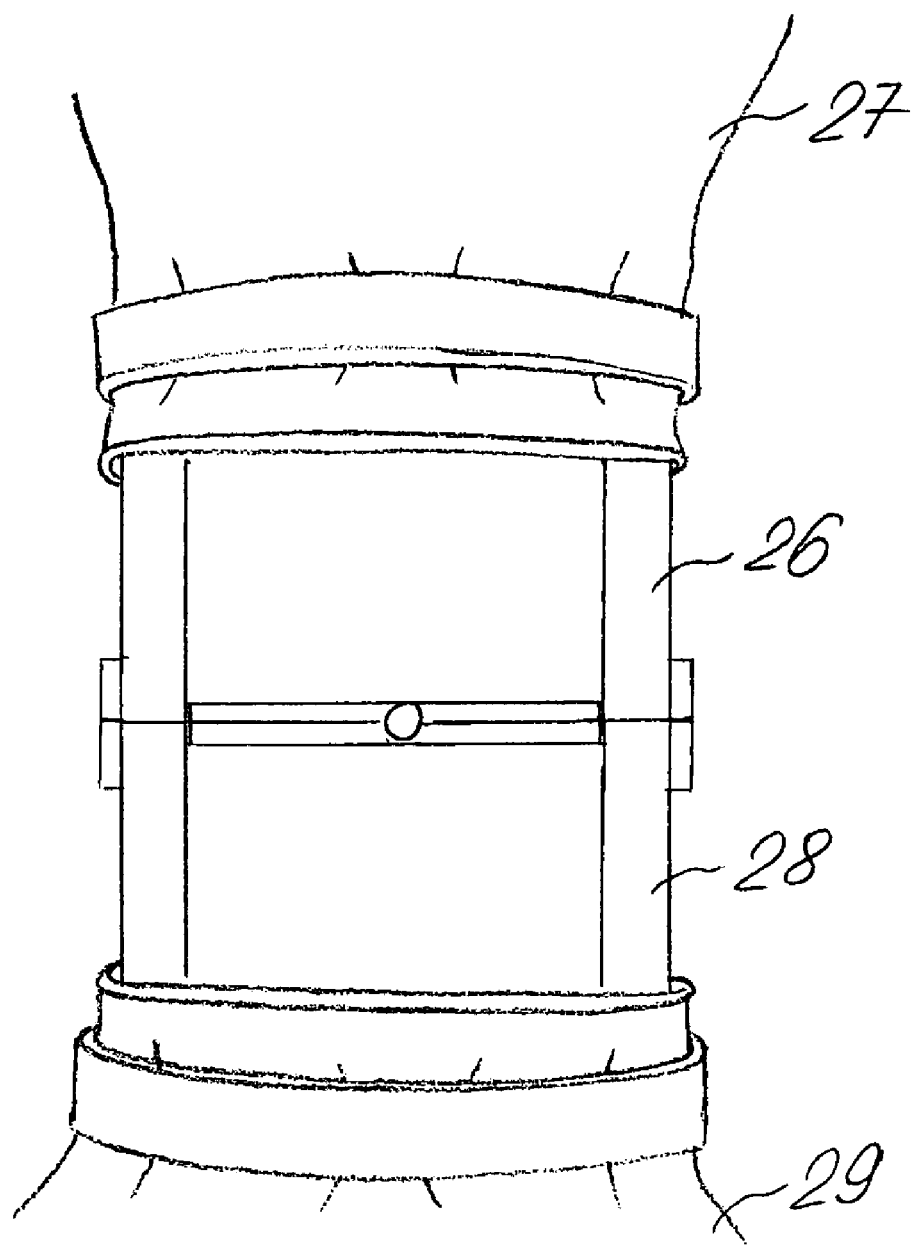
FIG. 21b is a cut-away view of an alternative embodiment of a sleeve and a liner shown in FIG. 21a where the split valve is in a "closed" position.

The liner of one or more of the embodiments may adhere to a valve. The valve may be secured to the neck region or to a longer sleeve. The adhesion of the liner to the valve may be by welding, adhesive, RF heating or any other suitable method. Preferably, the adhesion will provide an airtight seal for transfer of the chemicals from the liner to the connecting sleeve or the value means. The alternative embodiments of a sleeve and a liner are depicted in FIG. 19a through FIG. 21b. The liner 27 and 29 may be adhered to the inner surface of the upper sleeve 26 and lower sleeve 29, as depicted in FIG. 19a and FIG. 19b, or integrated within walls 26 and 29 of upper and lower sleeves, as depicted in FIG. 20a and FIG. 20b. Also, in an alternative embodiment a liner may be positioned over the outer surface of a sleeve or the valve means and secured to the sleeve by a ring. The ring may be adjustable to provide a secure connection between the liner and the valve. Alternatively, the ring may be heat shrinkable, as shown in FIG. 21a and FIG. 21b.

Figure 18A:
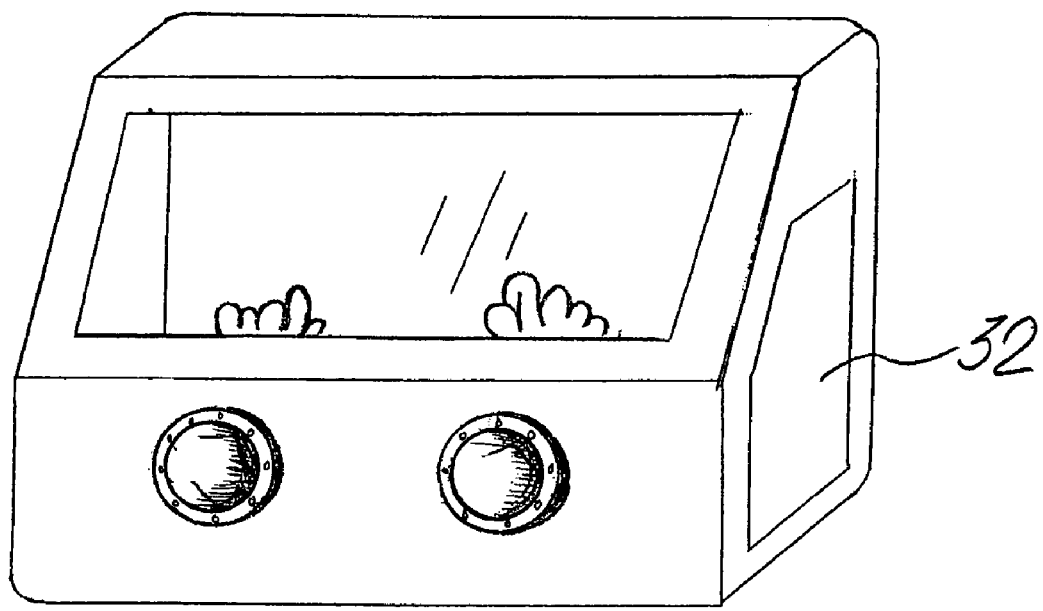
FIG. 18a is a view of a "glove box" of the present invention.
Figure 18B:
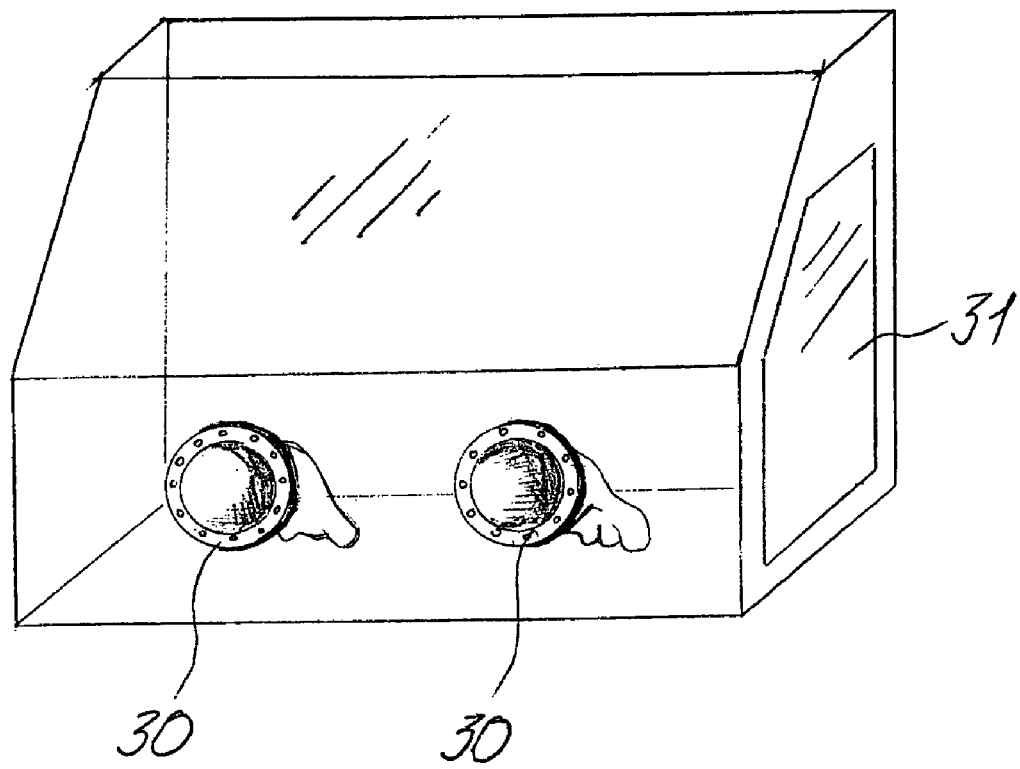
Figure 18C:
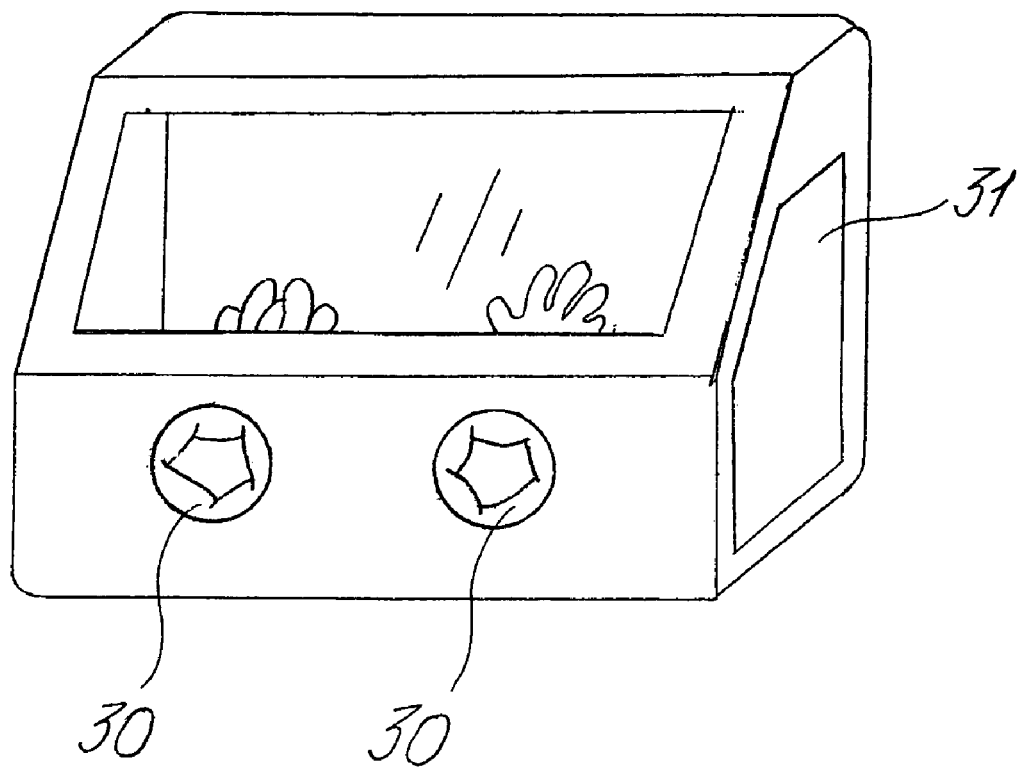

Another embodiment is shown in FIG. 18b-FIG. 18c. Glove boxes, a common type of which is depicted in FIG. 18a, provide an enclosed environment for handling hazardous and/or atmosphere-sensitive materials. Many of these glove boxes are also used for bio-hazardous materials. It is necessary to clean such glove boxes periodically because residual chemical or other elements may accumulate in the chamber of such glove boxes. Some of those residual elements might be highly toxic. In such event, cleaning workers may be exposed to toxins. To minimize this risk of exposure, a disposable lining for glove boxes may be used or entire glove box may be disposable. If a lining is used, such lining may be placed within a chamber in such way that it would not interfere with the operation of a glove box. In one embodiment, such lining may fit the inner space of a glove box chamber and may be made from any suitable flexible or firm plastic; it may be entirely transparent as shown in FIG. 18b or just have a window that correspond a window of the glove box as shown in FIG. 18c. Gloves and sleeves 30 may be made as an integrated part of a lining during a process of manufacturing of glove boxes as shown in FIG. 18c or gloves and sleeves 30 may be attached to corresponding apertures made in a lining as shown in FIG. 18b. A loading and unloading opening 31 with corresponding cover may be made in a side surface of a lining; the position of such side door 31 may be aligned with corresponding side door 32 of a glove box shown in FIG. 18a. It will be appreciated that the loading and unloading opening may be anywhere on the glove box and/or liner.

Figure 28:
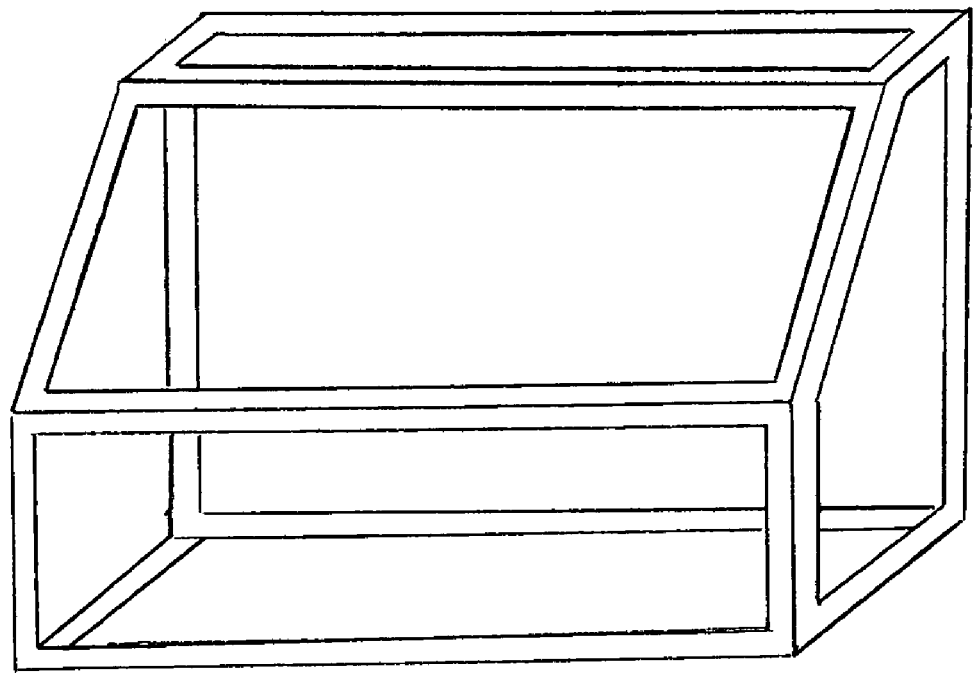
FIG. 28 is a prospective view of a frame for a glove box.
Figure 29:
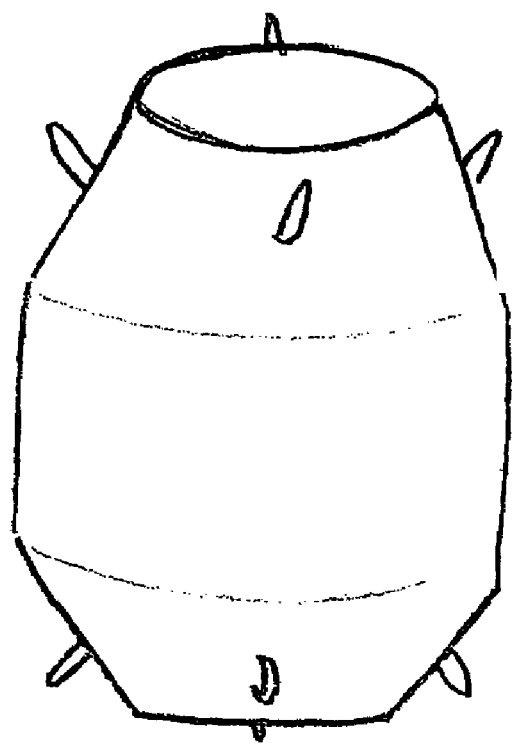
FIG. 29 is a prospective view of a disposable blender.

In another embodiment, a disposable glove box may be used. It may be made from flexible or rigid plastic. If a flexible plastic is used, a frame made from disposable rigid plastic and shaped to fit the size of a glove box may help such disposable glove box to maintain its shape as shown in FIG. 28. Such frame may be inserted into a glove box unassembled, then following assembly would allow glove box to adopt the shape of an assembled frame, or glove box may be shaped and then attached externally to a frame by any suitable mean of connection. Alternatively, the liner may retain the shape due to air pressure or other gas present in the liner. Also the liner may be in the form of two separate liners with a gap between the inner surface of one and the outer surface of the other. Air or other gas can inflate the liners to provide them with their shape.

A glove box of the invention may have access doors or ports for the loading and unloading of the glove box/containment booth. It may also have suitable flexible gloves molded, sealed or welded into the liner, as is standard on the existing glove box. There also may be fasteners of several designs which will facilitate the adherence of the liner into the glove box. These fasteners (not shown) may be mechanical hooks, clips or Velcro® type hook and loop fasteners, which will ensure adherence of the liner to the vessel wall.

As an alternative embodiment, an independent disposable container or blender may be used to combine and mix different chemical or pharmaceutical ingredients and dispense the resulting product. The container may have any shape and may be made from flexible or firm plastic or other disposable material. Such container may have inner ribs, baffles or fins, integrated during the process of manufacturing or attached to the inner surface of already existing container, as depicted in FIG. 6a through FIG. 17c. Furthermore, as shown in FIG. 23 a container may have one or more openings 36 to fill and/or empty it. It may be advantageous to be able to have all such openings tightly covered; such embodiment would allow the convenient transportation, storage and/or various manipulations which may be necessary to shake a container in order to enhance the blending of its contents.

Figure 24:
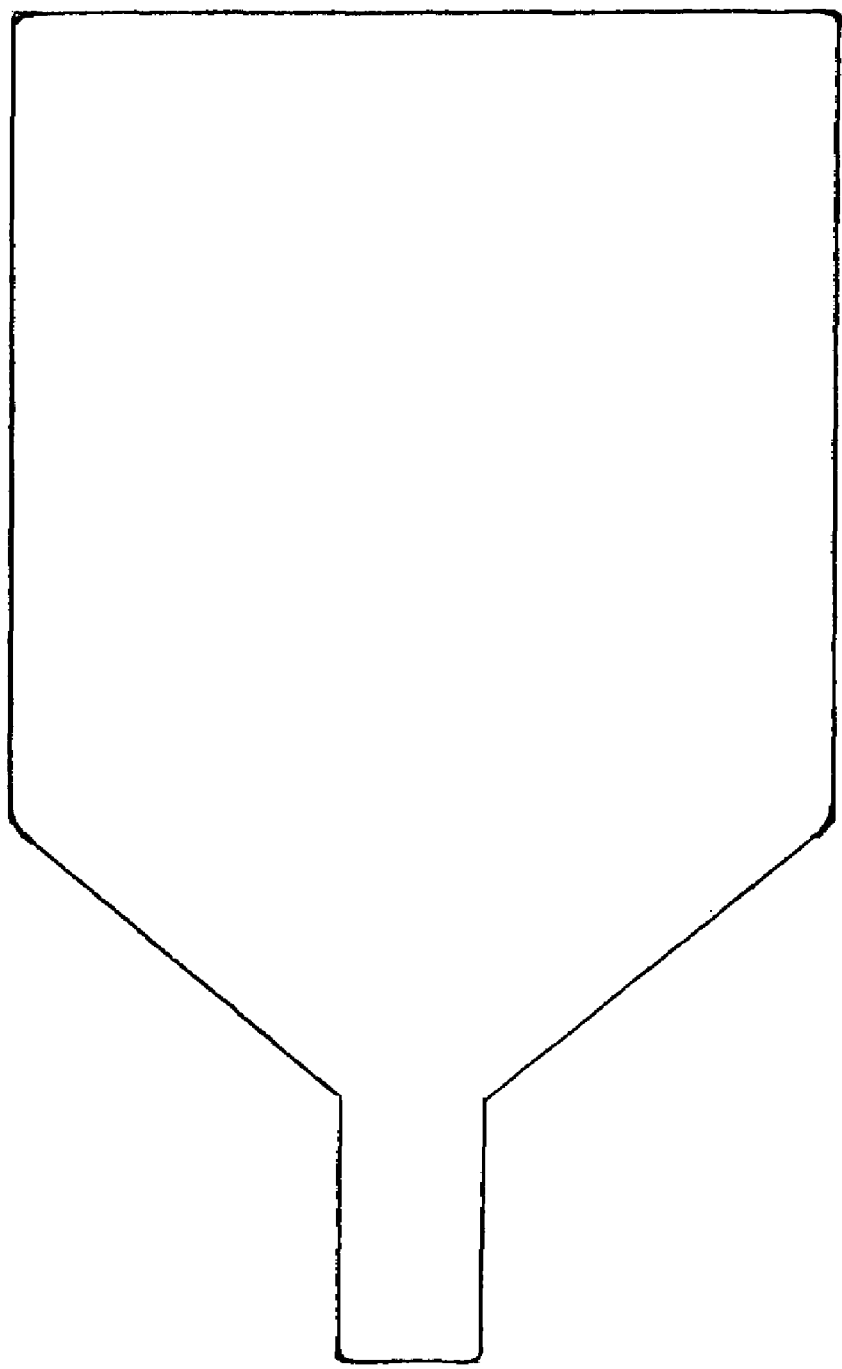
FIG. 24 is a view of a disposable sealed container.
Figure 25:
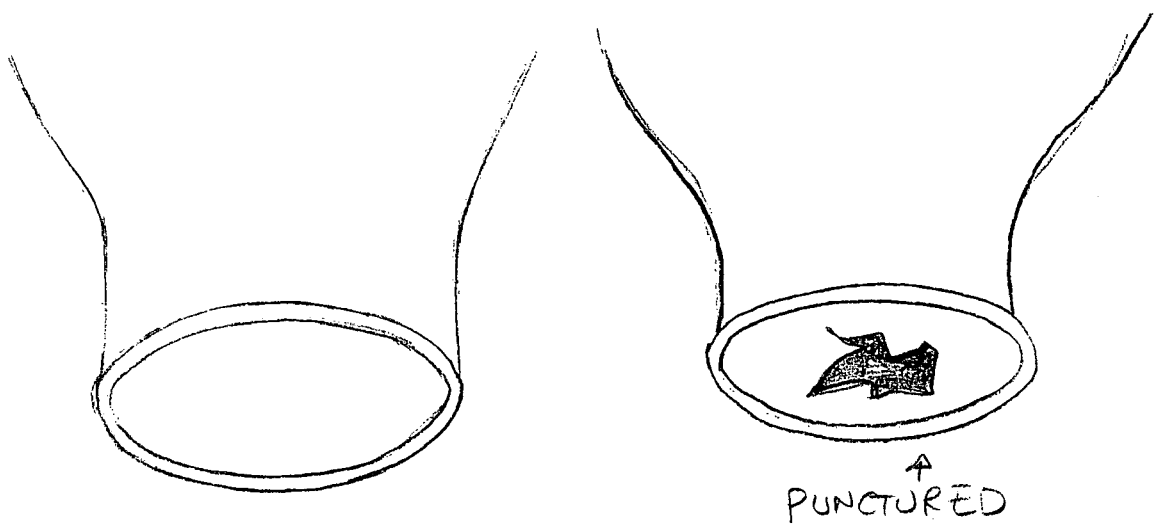
FIG. 25 is a prospective view of unpunctured and punctured portion of the container of FIG. 24.

In another embodiment, after a container is filled through an opening, such opening may be sealed as depicted in FIG. 24. In order to open such container and retrieve content, the wall of the container may be punctured as shown in FIG. 25. Preferably, the portion of the container to be punctured is adequately soft in order to readily allow such puncturing. In a different embodiment, the container may have one opening at one end of a container. Such opening may be equipped with a valve or another outlet door such as a cap, cover or lid to prevent undesirable spill through such opening and to regulate distribution of its contents. The means of the attachment of the outlet door to the container may vary. If a valve 37 is used as depicted in FIG. 26 the distribution of chemicals from such container may be regulated by such valve. Also, such valve may prevent the undesirable discharge and spill of contents of the container. The valve may be of any suitable type, like for example a gate valve, a needle valve, a globe valve, a plug valve, a ball valve, a "butterfly" valve or flat valve. Such valve may be integrated into the container during the process of manufacturing of the latter or attached later. The valve may be made from any suitable either flexible or firm plastic. The container may also have more than one opening as shown in FIG. 26. In such embodiment, the opening designed for the discharge of a content of the container may be equipped with either a valve or a cap 37. Through the other opening 36 the ingredients may be placed into a container. Such opening may also be equipped with a suitable cover to prevent the leakage of the content.

Also a container may have handles for convenient transportation as shown in FIG. 26. Such handles may be positioned on the outside surface of the container and integrated into it during manufacturing process or attached later. Alternatively, the container may have a means for supporting the container so that the container may be rotated for mixing the contents.

Figure 27:
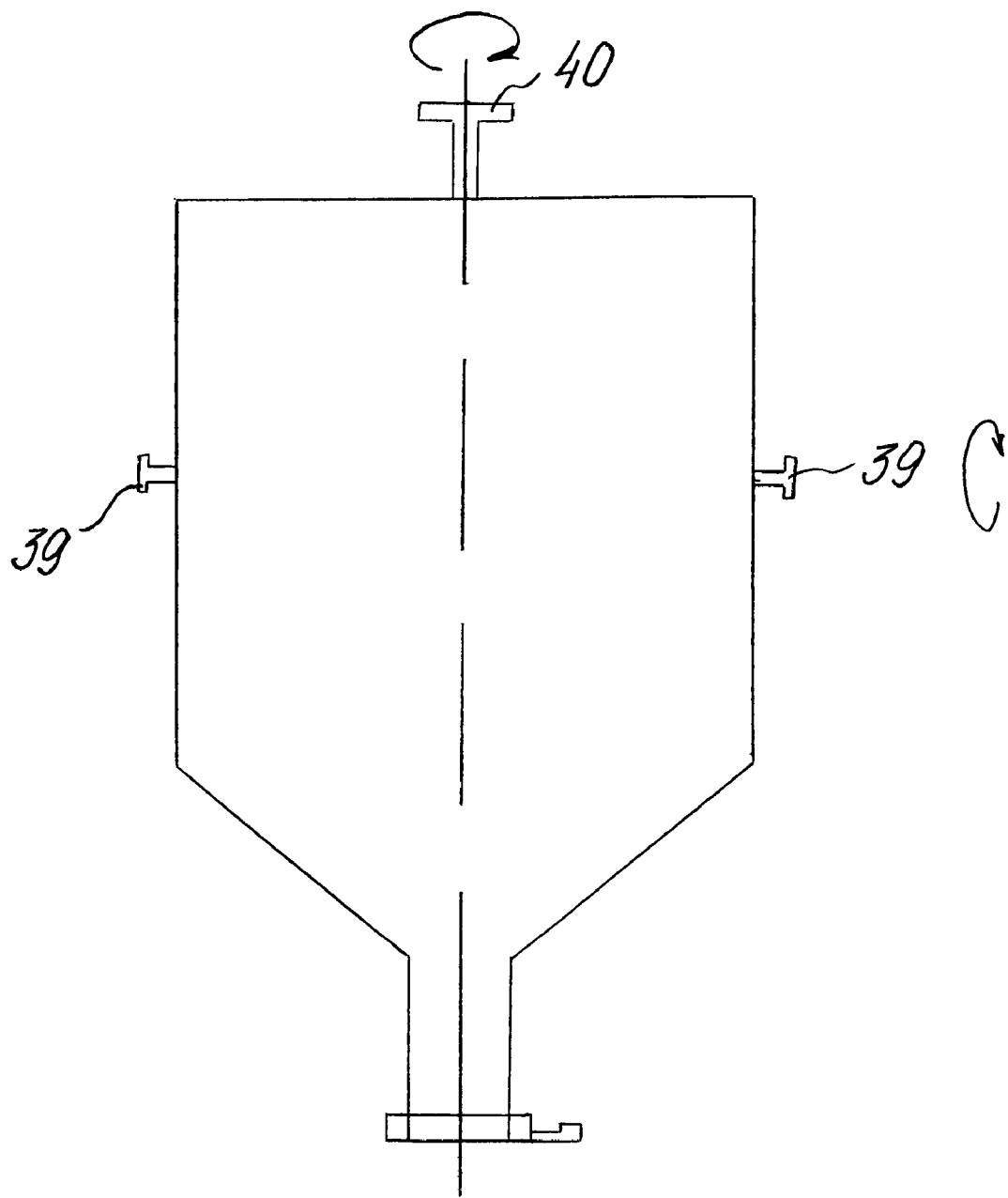
FIG. 27 is a view of a container with side and upper shafts.

As was shown in FIG. 26 and FIG. 27, in order to achieve better blending of ingredients placed in a disposable container, the latter may be rotated around its vertical or horizontal axis of symmetry. Therefore, the container may be equipped with shafts 39 attached to the opposite sides of a surface of a container and aligned for torsional movement as shown in FIG. 27 Suspended on such shafts a container may then be rotated. Or, the container may have a single shaft 40 attached to the one end of the container and aligned along the vertical axis of geometry for torsional movement. Suspended in such manner a container may then be rotated. Shaft or shafts may be integrated with a container during the phase of manufacturing or attached afterwards.

Figure 30:
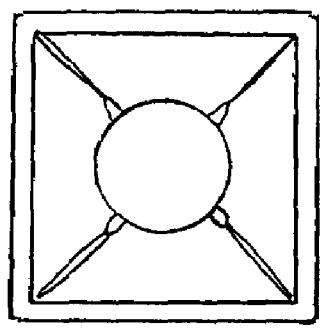
FIG. 30 is a top schematic view of a disposable blender of FIG. 29.
Figure 31:
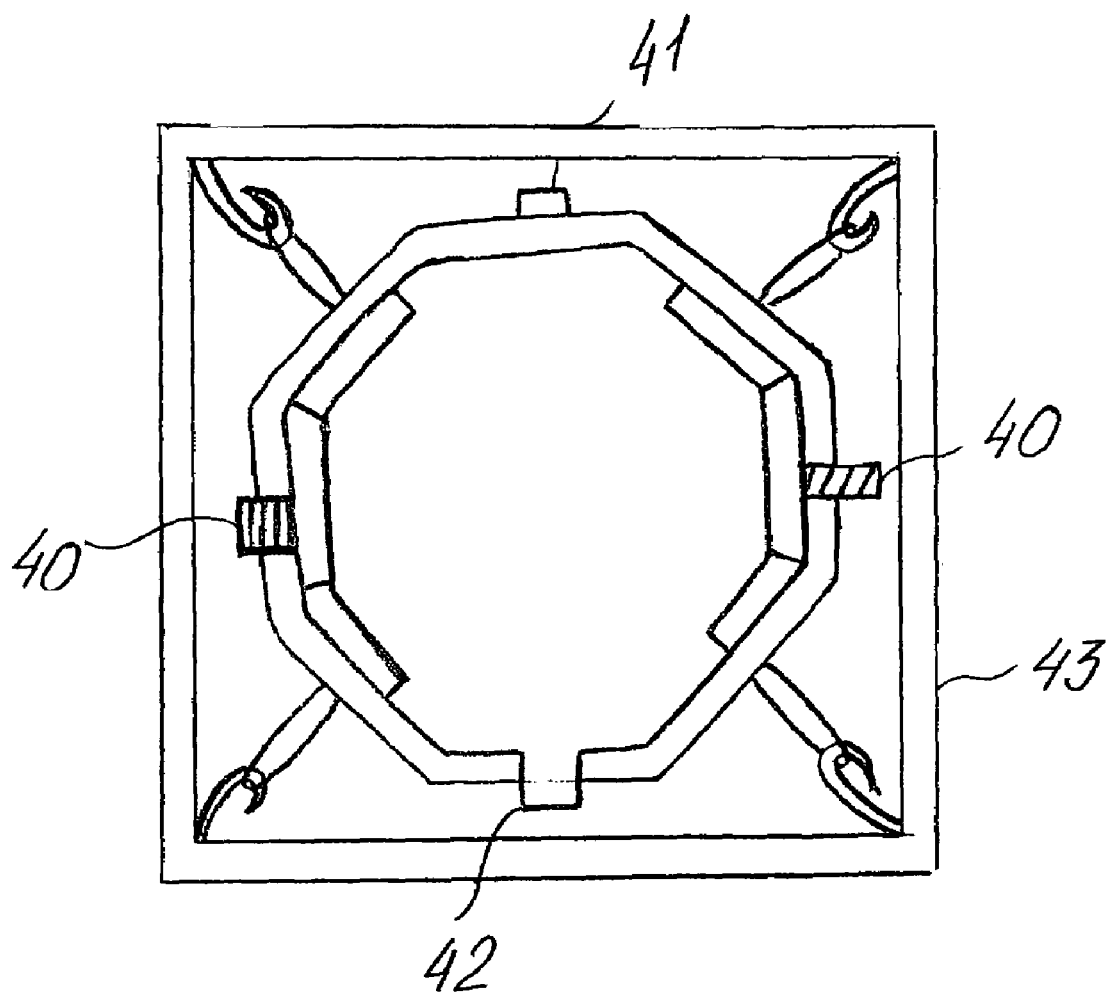
FIG. 31 is a detailed view of the disposable blender of FIG. 29.
Figure 33:
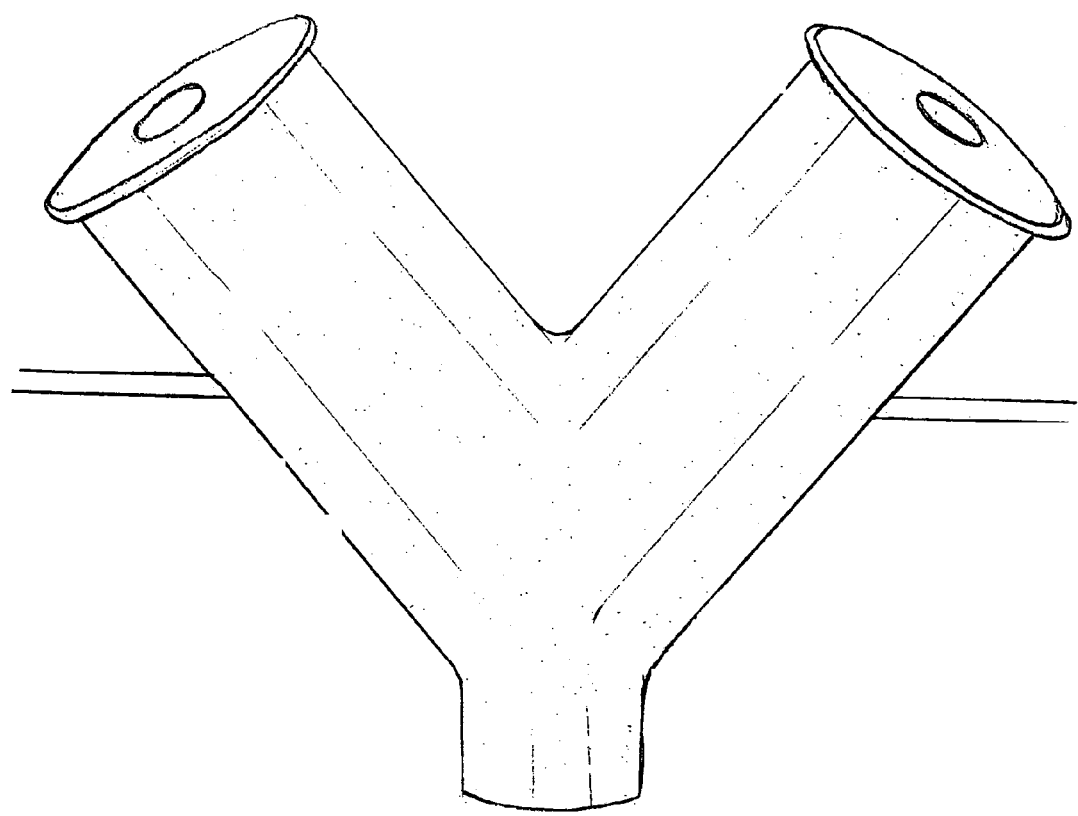
FIG. 33 is a view of double-sleeve portion of a disposable blender with even sleeve length.
Figure 34:
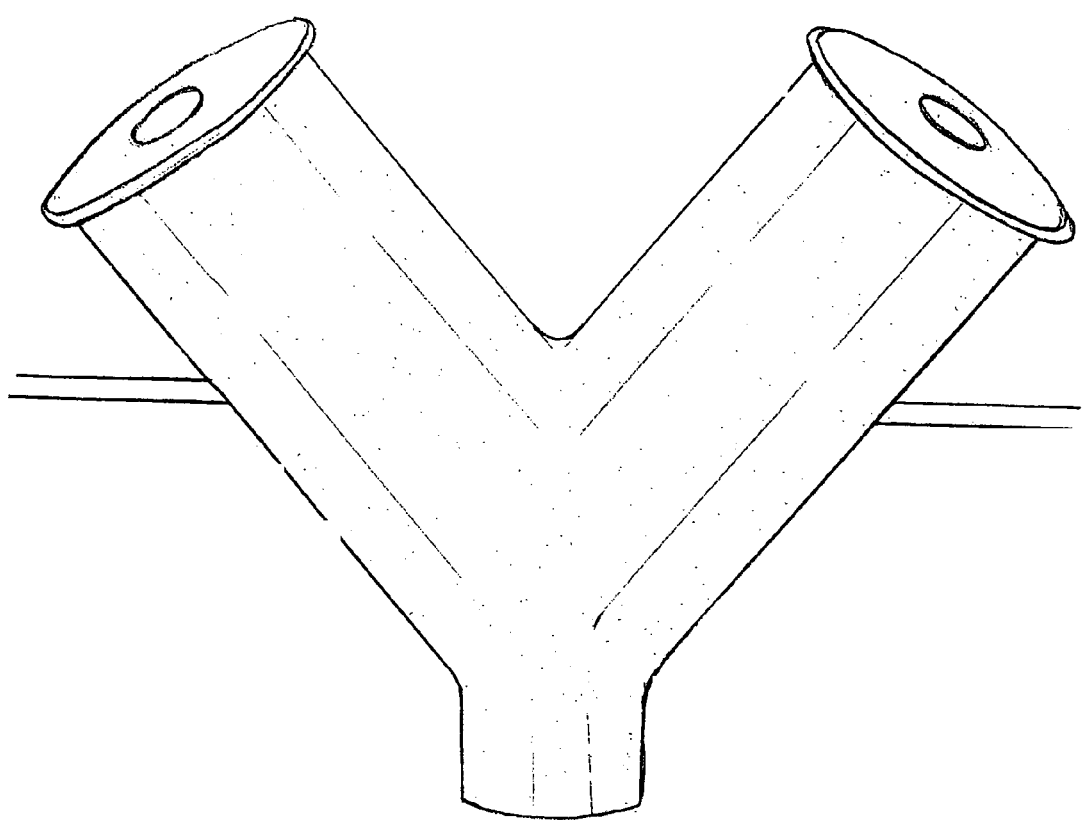
FIG. 34 is a view of double-sleeve portion of a disposable blender with uneven sleeve length.
Figure 35:
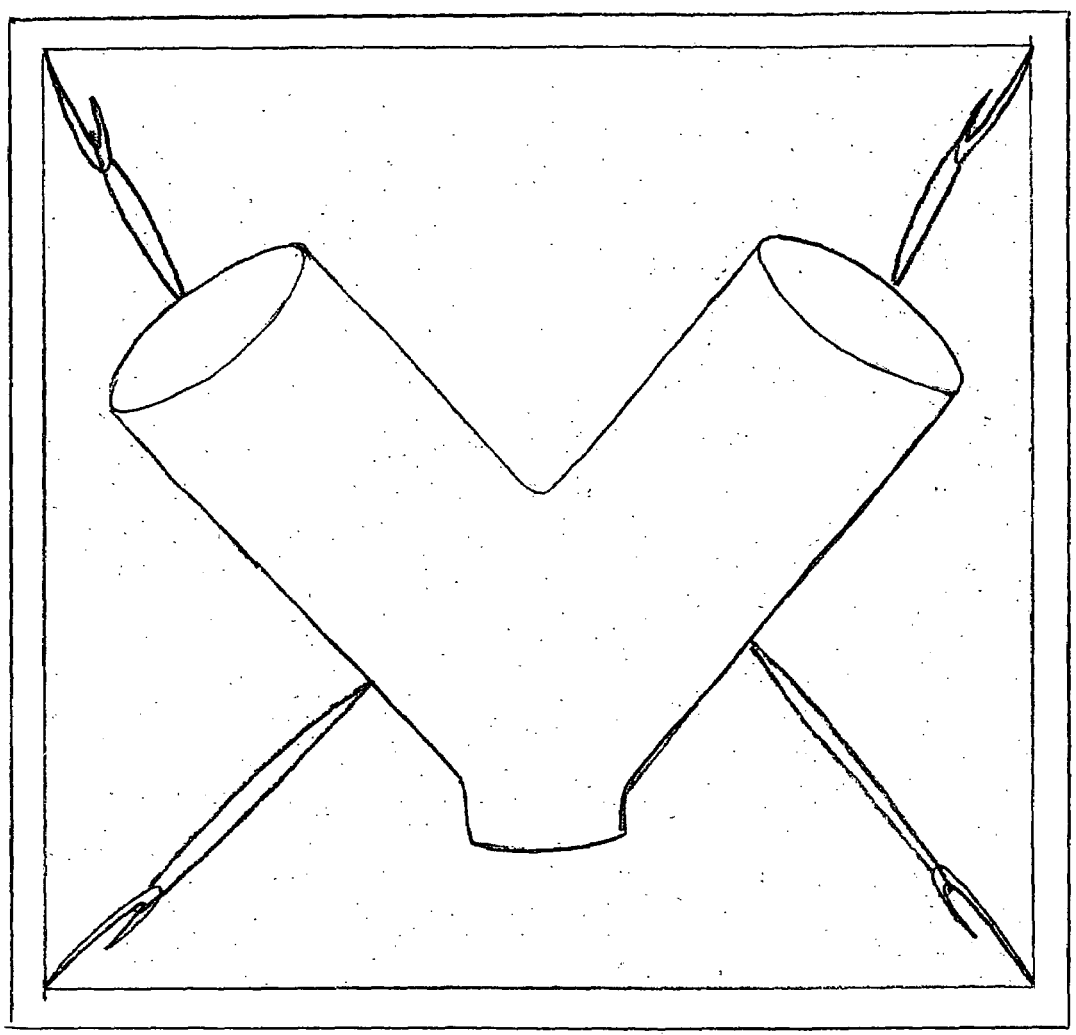
FIG. 35 is a side view of double-sleeve inflated disposable blender suspended on a frame.
Figure 36:
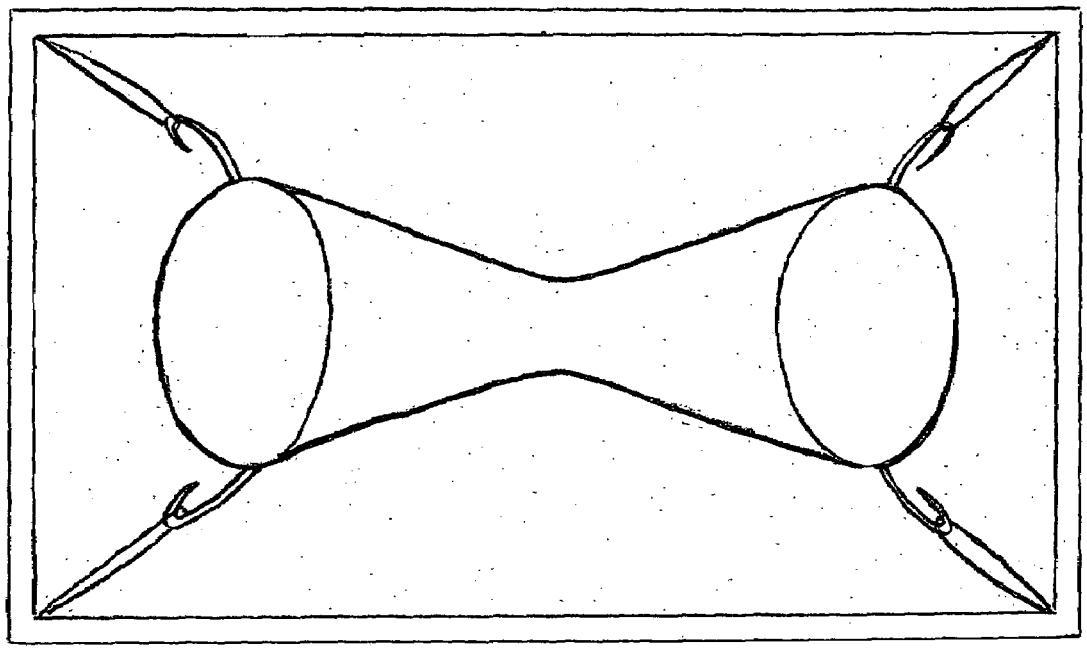
FIG. 36 is a top view of double-sleeve inflated disposable blender suspended on a frame.

Yet another embodiment of the invention may be disposable blender and preferably an inflatable disposable blender. Inflatable disposable blenders may provide the same capabilities as their rigid counterparts. At the same time inflatable blenders may be deflated if not in use thus providing exceptional storage and transportation capacity compared to non-inflatable blenders. The variations of such blender are shown in FIG. 29-34. The blender may have double-lining as shown in FIG. 32 and air or any other suitable gas may be injected between linings for a blender to be shaped. Correspondingly, a blender may be equipped with check inflation valve 40, as shown in FIG. 31. As depicted in FIG. 31, a single inflatable disposable blender may also have an opening for loading 41 where such opening may be equipped with proper cover and/or integrated split valve 42 in order to off load the contents. The inflatable blender or bladder may have any suitable shape and size that allows the blending of materials within it. To better maintain the shape after the blender has been inflated it may be suspended on the frame 43 of simple forms like, for example, a rectangular. For example, an inflatable blender may be stretched between corners of such rectangular frame, as indicated in FIG. 30 and FIG. 31. Still in another embodiment the blender may be manufactured with two or more entry conduits in a shape of sleeves as shown in FIG. 32-FIG. 36 sharing the same blending chamber. Each of such conduits may have a distinctive shape or length as shown in FIG. 34 or they may be identical as depicted in FIG. 34. Analogous to the single inflatable blender, the two or more conduit sleeves blenders may have double lining in order to be inflated where air is provided between linings.

When the transfer is complete, the present invention, liner, sleeve and upper valve member may be disposed of. Due to the low-cost manufacturing process and low-cost materials used in connection with the present invention, disposal prevents costly and harmful damage due to leaks and worker exposure.

We claim:

1. A disposable liner used for blending chemicals comprising a body for receiving chemicals to be blended, said body having an inside layer and an outside layer, said inside and outside layers being separated by a layer of gas that has been injected between said layers that inflates said outer layer and separates said outer layer from said inner layer such that said outer layer does not contact said inner layer, said inside layer having an outer surface that contacts said layer of gas between said inner layer and said outer layer and a product contact surface opposite said gas contact surface, said outside layer having an outer surface and an inner surface, said inside surface of said outer layer being adjacent the layer of gas, said product surface of said inside layer being adjacent to the chemicals to be blended, and a connecting sleeve having at least one orifice for receiving and discharging a product contained in said body, said connecting sleeve having secured to an end of said sleeve opposite said body a plastic upper valve member, said upper valve member forming an air tight seal on said connecting sleeve, said body being comprised of a flexible thermoplastic material that can be incinerated along with said valve member to dispose of said body and said valve member and any chemical residue remaining therein after evacuation of the body.

2. The disposable liner according to claim 1 wherein said liner has a base, one or more side walls extending from said base and a breast connected to said side walls opposite said base, said body having a neck with an orifice extending from said breast.

3. The disposable liner according to claim 1 wherein said valve member further comprises a disposable plastic housing having an upper valve attached to said orifice for receiving and discharging product, said upper valve having a generally flat upper surface that contacts the chemicals in said liner and a generally flat lower surface and wherein said lower surface never contacts the chemicals in the liner.

4. The disposable liner according to claim 3 wherein said valve member is removably attached to said body.

5. The disposable liner according to claim 3 wherein said valve may be releasably sealed to a lower valve member.

6. The disposable liner according to claim 3 wherein said liner has a venting means to allow air to flow in which the chemical is being drained from the line.

7. The disposable liner according to claim 6 wherein said venting means is permeable to air but impermeable to chemical particles and fumes.

8. The disposable liner according to claim 3 wherein said housing has an inner wall surface and an outer wall surface and wherein said liner is attached to said housing between said inner and outer wall surface.

9. The disposable liner according to claim 1 wherein said body has one or more baffles on at least a portion of its inner surface and extending outwardly from the inner surface of said body to assist in mixing of any contents in the body.

10. The disposable liner according to claim 9 wherein said baffle is formed from the same material as the inner surface of said body and formed in said liner during the manufacture of said liner.

11. The disposable liner according to claim 1 wherein said body has an intake valve for receiving a gas, said gas forcing at least a portion of said inner layer to inflate.

12. The disposable liner according to claim 1 wherein said liner has one or more handles for supporting the liner as the liner is rotate about an axis.

13. The blender according to claim 1 wherein said body has a generally a "y"shape.

14. An inflatable disposable blender for blending chemicals, said blender comprising a body for receiving chemicals to be blended, said body having an inside layer and an outside layer, said inside and outside layers being separated by a layer of gas that has been injected between said layers that inflates said outer layer and separate said outer layer from said inner layer, said inside layer having an outer surface that contacts said gas and a product contact surface opposite said gas contact surface, said outside layer having an outer surface and an inner surface, said inside surface being that contacts the layer of gas, said product surface of said inside layer being adjacent to the chemicals to be blended, said body having a first arm and a second arm extending from said body, said first and second arms being joined to said body and forming a blending chamber, said blending chamber having at least one orifice for receiving and discharging a product contained in said body, said blending chamber having secured to an end of said blending chamber a plastic upper valve member, said upper valve member forming an airtight seal on said blending chamber, said inner layer and said out layer of said body being comprised of at least one layer of a flexible thermoplastic material that can be incinerated along with said valve member to dispose of said blender and valve ember and any chemical residue remaining therein after evacuation of the chamber.

15. The blender according to claim 14 wherein said blender is suspended from a frame for mixing the contents of the blender.

16. The blender according to claim 15 wherein said first arm is larger in shape and size than said second arm.

17. The blender according to claim 14 wherein said blender may be deflated when not in use to remove the gas between said inner and outer layers and in said body for storage of the blender.

18. The blender according to claim 14 wherein a venting means allows air to enter into the body.

19. The bender according to claim 18 wherein the venting means allows air in the body while retaining chemical particles and fumes therein.

20. The blender according to claim 19 wherein the venting means is a mesh having 0.02 micron pores.

21. The blender according to claim 20 wherein the body can be compacted for disposal by burning.

22. The blender according to claim 21 wherein there is an inflation port present.

23. The blender according to claim 22 wherein the inflation port allows gas to be pumped into the body as a catalyst for mixing the contents of the blender.

24. The blender according to claim 23 gas is pumped through the inflation port to ensure the liner or pouch is tightly fitted to the interior surface of a vessel or container.

25. The blender according to claim 24 wherein gas pumped into the blender adds rigidity thereto.

26. The blender according to claim 14 wherein said first arm and said second arm are of equal size and shape.

27. The blender according to claim 14 wherein said arms and said body have an inside layer and an outside layer, said inside layer and outside layers being separated by a layer of gas.

* * * * *